US008958984B2

(12) United States Patent
Okude et al.

(10) Patent No.: US 8,958,984 B2
(45) Date of Patent: Feb. 17, 2015

(54) ROUTE SEARCH DEVICE, SERVER DEVICE AND NAVIGATION DEVICE

(75) Inventors: Mariko Okude, Hitachi (JP); Tomoaki Hiruta, Hitachinaka (JP); Jun Yamazaki, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 686 days.

(21) Appl. No.: 13/213,220

(22) Filed: Aug. 19, 2011

(65) Prior Publication Data

US 2012/0072107 A1 Mar. 22, 2012

(30) Foreign Application Priority Data

Sep. 17, 2010 (JP) ................................ 2010-209315

(51) Int. Cl.
| G01C 21/00 | (2006.01) |
| G01S 19/00 | (2010.01) |
| G08G 1/123 | (2006.01) |
| H04W 24/00 | (2009.01) |
| G01C 21/34 | (2006.01) |

(52) U.S. Cl.
CPC ................................... G01C 21/343 (2013.01)
USPC ........... 701/416; 701/408; 701/445; 701/446; 701/447; 701/527; 342/357.2; 342/357.22; 342/357.27; 342/357.31; 340/995.19; 455/456.1; 455/456.2

(58) Field of Classification Search
USPC ................. 701/400, 408–421, 445–450, 527; 342/357.1, 357.07, 357.09, 357.13, 342/357.2, 357.22, 357.27, 357.31; 340/995.19; 455/456, 456.1, 456.2
See application file for complete search history.

(56) References Cited

U.S. PATENT DOCUMENTS

| 6,628,233 | B2 * | 9/2003 | Knockeart et al. ........ 342/357.31 |
| 6,784,832 | B2 * | 8/2004 | Knockeart et al. ........ 342/357.31 |
| 6,812,888 | B2 * | 11/2004 | Drury et al. .............. 342/357.31 |
| 6,909,398 | B2 * | 6/2005 | Knockeart et al. ........ 342/357.31 |
| 6,941,220 | B2 * | 9/2005 | Le et al. ........................ 701/419 |

(Continued)

FOREIGN PATENT DOCUMENTS

| EP | 1 852 680 A1 | 11/2007 |
| EP | 1 995 559 A1 | 11/2008 |

(Continued)

OTHER PUBLICATIONS

Japanese Office Action with English Translation dated Jan. 29, 2013 (five (5) pages).

(Continued)

*Primary Examiner* — James Trammell
*Assistant Examiner* — Majdi Alsomiri
(74) *Attorney, Agent, or Firm* — Crowell & Moring LLP

(57) ABSTRACT

A route search device includes: map data; a derived route acquisition section that acquires a first derived route from an origin point to a destination; a route correction region acquisition section that acquires a route correction region; a place to be passed through setting section that sets a place to be passed through in the route correction region; a start point and end point setting section that sets a start point and an end point in the route correction region; a corrected route acquisition section that acquires a corrected route; and a route correction section that corrects the first derived route to a second derived route from the origin point to the destination, constituted by a route from the origin point to the start point, the corrected route, and a route from the end point to the destination.

9 Claims, 17 Drawing Sheets

(56) References Cited

U.S. PATENT DOCUMENTS

| | | | |
|---|---|---|---|
| 6,968,272 B2* | 11/2005 | Knockeart et al. | 701/414 |
| 7,050,905 B2* | 5/2006 | Nemeth | 701/467 |
| 7,136,749 B2* | 11/2006 | Ichihara et al. | 701/533 |
| 7,149,625 B2* | 12/2006 | Mathews et al. | 701/420 |
| 7,283,905 B1* | 10/2007 | Beesley et al. | 701/420 |
| 7,432,830 B2* | 10/2008 | Behr et al. | 340/995.24 |
| 7,822,539 B2* | 10/2010 | Akiyoshi et al. | 701/418 |
| 7,865,306 B2* | 1/2011 | Mays | 701/437 |
| 7,924,173 B2* | 4/2011 | Behr et al. | 340/995.24 |
| 2002/0103599 A1* | 8/2002 | Sugiyama et al. | 701/211 |
| 2004/0049338 A1* | 3/2004 | Beesley et al. | 701/202 |
| 2005/0021228 A1 | 1/2005 | Choi | |
| 2007/0061071 A1 | 3/2007 | Torii | |

FOREIGN PATENT DOCUMENTS

| | | |
|---|---|---|
| JP | 2002-228471 A | 8/2002 |
| JP | 2002-286478 A | 10/2002 |
| JP | 2002-323335 A | 11/2002 |
| JP | 2004-28703 A | 1/2004 |
| JP | 2005-43335 A | 2/2005 |
| JP | 2005-98814 A | 4/2005 |
| JP | 2005-274315 A | 10/2005 |
| JP | 2006-322782 A | 11/2006 |
| JP | 2007-78573 A | 3/2007 |

OTHER PUBLICATIONS

European Search Report dated Feb. 17, 2014 (seven (7) pages).

* cited by examiner

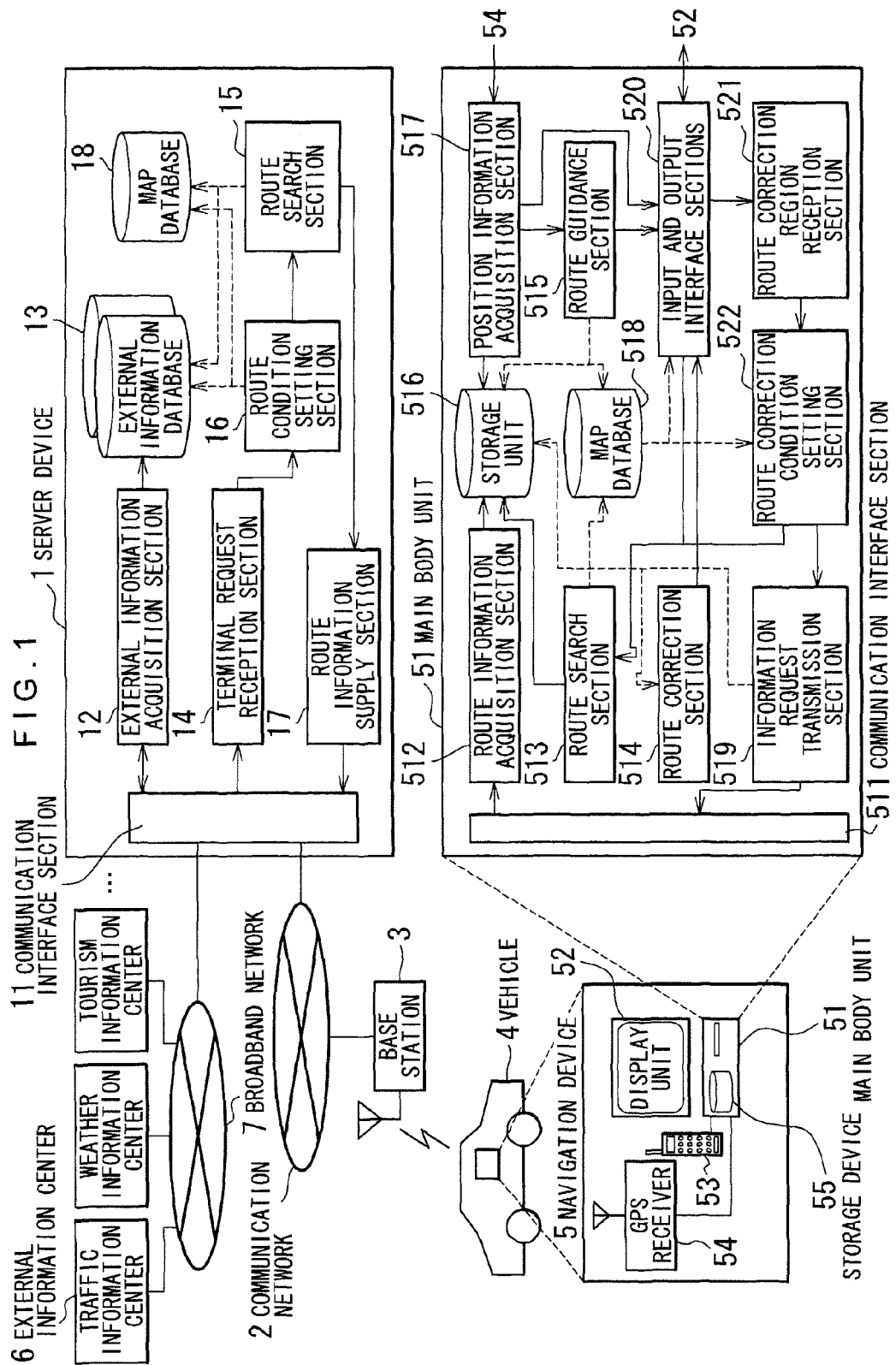

F I G . 12A
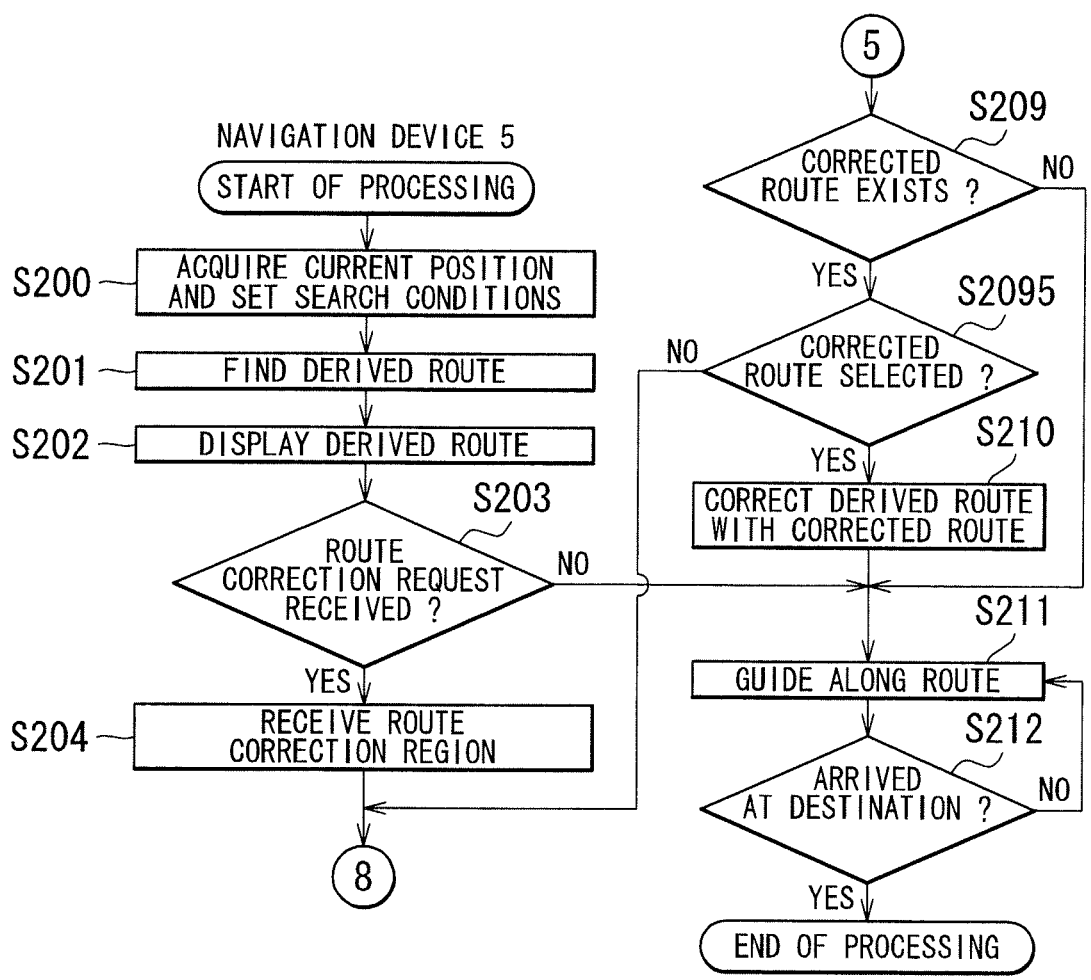

ROUTE SEARCH DEVICE, SERVER DEVICE AND NAVIGATION DEVICE

INCORPORATION BY REFERENCE

The disclosure of the following priority application is herein incorporated by reference: Japanese Patent Application No. 2010-209315, filed Sep. 17, 2010.

BACKGROUND OF THE INVENTION

1. Field of the Invention

The present invention relates to a route search device that supplies route information corresponding to a multi-purpose request from a user, to a server device, and to a navigation device, and also relates to a route search system in which data transfer is performed via communication between a navigation device and a server device.

2. Description of Related Art

With a prior art navigation device (that is one embodiment of a route search device), when search conditions have been specified according to which the user wishes to travel, such as for example prioritization of distance, prioritization of time required, prioritization of toll fare, prioritization of toll roads, and so on, it is arranged, using a cost that corresponds to the specified search conditions, to calculate a route from the origin point to the destination for which this cost becomes a minimum, and this route is provided to the user. And there is also a per se known type of navigation device with which it is arranged to calculate all together a plurality of routes according to various search conditions, and then the user is invited to select the route that he wishes to follow, so that the user can confirm the route along which he wishes to be guided to the destination by selecting the route that he wants to use. Generally it is the case that all of the routes from the origin point to the destination are calculated on the basis of the same search conditions.

On the other hand, navigation devices are in widespread use that receive the newest up-to-date information from an external information center via broadcast or via individual communication, and that derive a route to the destination in consideration of this newest information. For example, as basic functions of a navigation device, there may be provided a function of receiving the most up-to-date traffic information, such as congestion and travel times and so on, supplied from a traffic information center via an FM multiplex broadcast or the like, a function of calculating a route to the destination that will take the shortest time in the light of this information, and a function of guiding the user along this route to the destination. And navigation devices are also in use that, in order to be able to forecast the time point of arrival at the destination with better accuracy, acquire from an information center forecast traffic information for a route by which it is possible to arrive at the destination more quickly at the time that the vehicle is scheduled to pass along that route, and that thereby calculate an optimum route to the destination and guide the user along that route to the destination. There are also systems that are adapted to acquire an optimum route that is calculated so as to reflect the newest traffic information from the information center, and to guide the user along that route to the destination.

There is a trend to improve navigation services by inputting into the terminal many different types of information stored upon external sites (thus, this information is not limited only to traffic information), and moreover by obtaining the newest version of such information. For example, route information to the destination, the time of origin, attribute information such as the availability of intermediate rest locations, and so on may be supplied by a portal site that supports travel planning at home, and that takes into consideration the most up-to-date information that changes dynamically, such as the conditions of facilities and road tolls and the state of usage of facilities and event information and so on. Services also exist that, by travel information planned upon the portal site being transferred to a navigation device via a medium or by data communication, enable the user to employ this travel information for route display, and that enable guidance to the destination based upon this travel information.

If the route that is supplied by a navigation device of this type is different from what the user decides that he wants, then the user may intentionally ask the navigation device to re-calculate another route to the destination along which the subject vehicle is to be guided so that he can deviate from this route, and the general method employed for causing this recalculation of the route by the navigation device is to set some intermediate ground point to be passed through. With this type of prior art method the possibility arises that, on the contrary, some road section upon the route that was initially supplied along which the user desires to travel may no longer be included upon the newly re-calculated route.

Thus, in Japanese Laid-Open Patent Publication 2002-286478 for example, there has been disclosed a technique by which the user can select certain roads along which he does not want to travel from among the plurality of roads making up a route that has been derived, and by which he can also select roads along which he wishes to travel from among those roads that are displayed other than those upon the derived route. Due to this, it is arranged to perform route searching in such a manner that the roads that the user does not want to employ are avoided, and so that the roads that he does want to employ are given higher priority. Since there is no setting of any intermediate ground point, but only setting of roads that the user does not want to travel along and of roads that he wants to travel along, accordingly it is possible to enhance the probability that the route that comes to be selected does indeed match the desires of the user.

SUMMARY OF THE INVENTION

However since, according to the techniques disclosed in Japanese Laid-Open Patent Publication 2002-286478, it is necessary for the user clearly to select the positions upon the road map of the roads along which he wishes to pass and the positions of the roads along which he does not wish to pass, accordingly there is the problem that sometimes it may be difficult for a user who is not very well acquainted with the roads around the region where he intends to travel to select the appropriate roads.

According to the 1st aspect of the present invention, a route search device comprises: map data of a road map; a derived route acquisition section that acquires a first derived route for a mobile body from an origin point of the mobile body to a destination of the mobile body; a route correction region acquisition section that acquires a route correction region corresponding to the first derived route; a place to be passed through setting section that sets a place to be passed through in the route correction region; a start point and end point setting section that sets a start point and an end point in the route correction region; a corrected route acquisition section that acquires a corrected route, not included in the first derived route, from the start point and passing through the place to be passed through to arrive at the end point; and a route correction section that corrects the first derived route to a second derived route from the origin point to the destination, constituted by a route from the origin point to the start point, the corrected route, and a route from the end point to the destination.

According to the 2nd aspect of the present invention, in the route search device according to the 1st aspect, it is preferred that the route correction region acquisition section acquires the route correction region in correspondence with a partial region upon the road map; and the start point and end point setting section calculates a plurality of points of intersection between the external periphery of the route correction region and the first derived route, and determines and sets the start point and the end point respectively from among a plurality of ground points upon the first derived route that are closest to the plurality of points of intersection.

According to the 3rd aspect of the present invention, in the route search device according to the 1st aspect, it is preferred that the route correction region acquisition section acquires the route correction region in correspondence with a partial region upon the road map; and the start point and end point setting section, along with selecting, from among a plurality of intersections that are located in the vicinity of the external periphery of the route correction region, start point candidates for the start point in order of closeness to the origin point, also selects end point candidates for the end point from the plurality of intersections in order of closeness to the destination, then searches for a route section that is connected from a start point candidate among the start point candidates to an end point candidate among the end point candidates, and then sets the start point candidate and the end point candidate of the route section that has been found as the start point and the end point.

According to the 4th aspect of the present invention, in the route search device according to the 1st aspect, it is preferred that the route search device further comprises a pass through frequency storage section that stores, included in the map data, pass through frequencies by a plurality of mobile bodies that pass through at least one of a plurality of intersections and a plurality of roads. The place to be passed through setting section, by referring to the pass through frequency storage section, preferentially sets at least one of an intersection and a road whose pass through frequency is high as the place to be passed through.

According to the 5th aspect of the present invention, in the route search device according to the 1st aspect, it is preferred that the route search device further comprises a road attribute storage section that stores road attributes of a plurality of roads, included in the map data. The place to be passed through setting section, by referring to the road attribute storage section, sets a road having a predetermined road attribute as the place to be passed through.

According to the 6th aspect of the present invention, a server device comprises: a route search device according to the 1st aspect; a reception section that receives the first derived route, the route correction region, and a search condition for the first derived route via a communication network from a navigation device; and a transmission section that transmits the corrected route to the navigation device. The derived route acquisition section acquires the first derived route that has been received by the reception section; and the route correction region acquisition section acquires the route correction region that has been received by the reception section.

According to the 7th aspect of the present invention, in the server device according to the 6th aspect, it is preferred that the route correction region acquisition section acquires the corrected route on the basis of another search condition that is different from the search condition for the first derived route.

According to the 8th aspect of the present invention, a server device comprises: a route search device according to the 1st aspect; a reception section that receives the origin point, the destination, the route correction region, and a search condition for the first derived route via a communication network from a navigation device; and a transmission section that transmits the first derived route, the second derived route, and the corrected route to the navigation device. The derived route acquisition section acquires the first derived route by searching and calculation on the basis of the origin point, the destination, the search condition for the first derived route, and the map data.

According to the 9th aspect of the present invention, a navigation device comprises: a route search device according to the 1st aspect; a display unit that displays the road map, the first derived route, and the second derived route; a current position information acquisition section that acquires current position information indicating a current position of the mobile body; an input section for input by a user of the destination, the route correction region, and a search condition for the first derived route; and a route guidance section that guides the mobile body using the second derived route. When the mobile body is positioned at the origin point, the origin point is the current position acquired by the current position information acquisition section; and the route correction region acquisition section acquires the route correction region inputted via the input section.

According to the 10th aspect of the present invention, in the navigation device according to the 9th aspect, it is preferred that the display unit displays map information for the route correction region acquired by the route correction region acquisition section and route information for the corrected route, at a larger magnification than map information other than the route correction region and route information other than the corrected route.

According to the 11th aspect of the present invention, a navigation device comprises: a route search device according to the 1st aspect; a current position information acquisition section that acquires current position information indicating a current position of the mobile body; an input section for input by a user of the destination, the route correction region, and a search condition for the first derived route; a transmission section that transmits the first derived route, the route correction region, and the search condition for the first derived route to a server device via a communication network; a reception section that receives the corrected route from the server device; and a route guidance section that guides the mobile body using the second derived route. When the mobile body is positioned at the origin point, the origin point is the current position acquired by the current position information acquisition section; and the corrected route acquisition section acquires the corrected route received by the reception section.

BRIEF DESCRIPTION OF THE DRAWINGS

FIG. 1 is a figure showing the overall structure of a route search system according to an embodiment of the present invention;

FIG. 3 is a figure showing a processing flow for setting a provisional place to be passed through;

FIG. 4 is a supplementary figure for further explanation of this processing flow for setting of a provisional place to be passed through;

FIGS. 11A and 11B are figures for explanation of an example of processing for selection of a provisional place to be passed through;

FIGS. 12A and 12B are figures showing a route search processing flow of a navigation device according to another embodiment of the present invention.

DESCRIPTION OF THE PREFERRED EMBODIMENTS

Figure 2A:
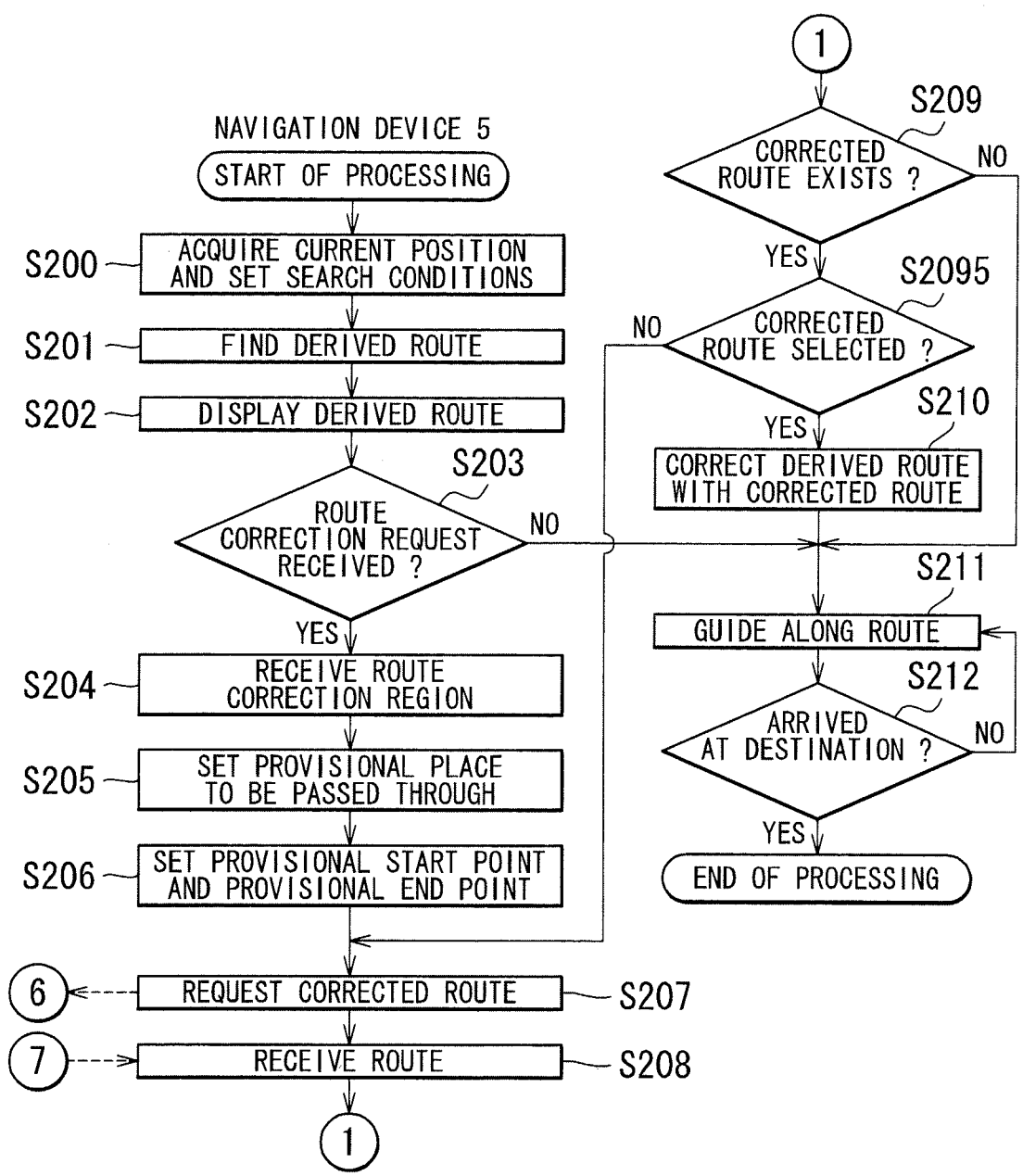
FIGS. 2A and 2B are figures showing the overall processing flow of this route search system.

In the following, embodiments of the present invention will be explained in detail with reference to the drawings.

FIG. 1 is a figure showing the overall structure of a route search system (a route search device) according to one embodiment of the present invention. This route search system includes a server device 1 (a route search device) and a navigation device 5 (a route search device) that is mounted upon a vehicle 4. In FIG. 1, the server device 1 is connected to a communication network 2, and is connected to the navigation device 5 by wireless communication via a base station 3 such as a mobile telephone service or the like. Moreover, the server device 1 is also connected via a broadband network 7 to an external information center 6 such as a traffic information center, a weather information center, a tourism information center, or the like.

The server device 1 is built as a computer (i.e. an information processing device) that includes a CPU (Central Processing Unit) not particularly shown in the figures, a memory device, a hard disk device, and so on. And as shown in FIG. 1, this server device 1 includes, as functional blocks, a communication interface section 11, an external information acquisition section 12, an external information database 13, a terminal request reception section 14, a route search section 15, a route condition setting section 16, a route information supply section 17, a map database 18, and so on. It should be understood that these functional blocks may be implemented by the CPU not shown in the figures executing programs that are stored in a semiconductor memory not shown in the figures or on a hard disk device not shown in the figures.

In FIG. 1, the external information acquisition section 12 acquires information of various types such as traffic information, weather and facilities information, and so on (including audio and video information), and accumulates this information in the external information database 13. The terminal request reception section 14 receives a route request transmitted from the navigation device 5, analyzes the contents of this request, and notifies the result of this analysis to the route search section 15. At this time, this route request from the navigation terminal device includes information such as the position of the vehicle that is requiring this route search (or an origin point), a destination, a planned date and time for travel, search conditions, and so on.

Conditions such as prioritization of toll roads, prioritization of distance or time, consideration of the state of traffic, and so on are typically used as search conditions. It would also be acceptable to arrange for conditions that include some ambiguity within a range that can be interpreted by the server device 1 to be received as search conditions, such as "popular route" or "recommended route" or the like. In this case, conversion processing would be performed by the terminal request reception section 14 for converting these ambiguous search conditions into more concrete search conditions. For example, such an ambiguous condition may be converted into an item according to which information can be searched in a concrete manner, and a search key may be created from this item: for instance, "popular route" may be converted into the concept of a road whose frequency of use is high, and "recommended route" may be converted into the concept of a road that passes through a ground point in which the user has a high degree of interest.

If no information hit by the search key that has been created is present in the external information database 13, or if the conclusion is that the most up-to-date information is required, then, using this search key, the required information is gathered from the external information center 6 via the external information acquisition section 12. This gathered information is accumulated in the external database 13. It is arranged to gather periodically from the external information center 6 information that is frequently utilized as a route search condition and that fluctuates over a comparatively short time scale, such as traffic information and weather information and so on. Information that is gathered periodically in this manner is accumulated in the external information database 13, and accordingly the external information database 13 always holds the newest version of this type of information.

The route search section 15 receives the request analyzed by the terminal request reception section 14, refers to the external information database 13 and the map database 18 and acquires the information required for route searching, and calculates a derived route from the origin point to the destination. The Dijkstra method for obtaining the route of minimum cost from the origin point to the destination is generally employed as the algorithm for this route search.

On the basis of the information request received via the terminal request reception section 14, the route condition setting section 16 sets search conditions such as start and end points for the route to be found, priority roads, date and time, area, and so on, and asks the route search section 15 to execute route searching. And the route information supply section 17 generates response data including derived route information outputted by the route search section 15, and transmits this response data to the navigation device 5.

As shown in FIG. 1, the navigation device 5 includes a display unit 52, a mobile telephone unit 53, a GPS (Global Positioning System) receiver 54 and so on, all connected to a main body unit 51. Here, the main body unit 51 is built as a compact computer that includes a storage device 55 such as a memory or a hard disk device. It should be understood that this storage device 55 may also be a DVD (Digital Versatile Disk) or a transportable memory card or the like. The main body unit 51 communicates with the base station 3 with the portable telephone unit 53, and also is connected to the server device 1 via the communication network 2. Instead of employing the portable telephone unit 53, it would also be acceptable to arrange for the connection to the server device 1 to be via some other type of communication device, such as a wireless communication unit or the like.

The navigation device 5 is able to receive supply of a derived route from the server device 1 by transmitting a route request to the server device 1. And the navigation device 5 outputs route guidance command information corresponding to this derived route to the display unit 52. It should be understood that it would also be acceptable to arrange for this route guidance command information to be outputted as audio using a speaker or the like.

The main body unit 51 includes functional blocks such as a communication interface 511, a route information acquisition section 512, a route search section 513, a route correction section 514, a route guidance section 515, a storage unit 516, a position information acquisition section 517, a map database 518, a information request transmission unit 519, input and output interface sections 520, a route correction region reception section 521, a route correction condition setting section 522, and so on.

The route information acquisition section 512 is connected to the server device 1 via the communication interface section 511. Via the information request transmission unit 519, this route information acquisition section 512 requests a derived route from the origin point or the current position to the destination, or a corrected route for a predetermined section that has been set within a derived route. And the route information acquisition section 512 acquires route information corresponding to this request from the server device 1 via the route information acquisition section 512, and stores this route information in the storage unit 516.

The route search section 513 searches for a route to the destination on the basis of the information inputted by the user via the input and output interface section 520, vehicle position information acquired from the position information acquisition section 517, and the map database 518. And, in addition to performing route searching from the origin point to the destination, the route search section 513 refers to the derived route that has been obtained from the server device 1, and determines this derived route obtained from the server device 1 as being the derived route for travel guidance to the destination.

The route correction section 514 reads in a corrected route for correcting a predetermined section of the derived route from the storage unit 516, and creates a new derived route by replacing that predetermined section with the corrected route. The corrected route is calculated in the following manner. The route correction region reception section 521 receives a derived route correction request from the input and output interface 520, and sets a correction area. And the route correction condition setting section 522 sets a search cost and search conditions, and provisional places to be passed through and provisional start and end points for finding a corrected route that passes through this correction area. Searching for a corrected route on the basis of the above conditions is executed by the route search section 513, and the corrected route that has been obtained is stored in the storage unit 516.

If the route search section 15 of the server device 1 finds a corrected route, then, instead of starting the route search section 513, the route correction condition setting section 522 requests the corrected route from the server device 1 via the information request transmission unit 519. And the corrected route that has been calculated by the route search section 15 of the server device 1 is acquired by the route information acquisition section 512 via the communication interface 511, and is stored in the route storage unit 516. It would also be acceptable to acquire a plurality of corrected routes from the server device 1, and to store them in the route storage unit 516.

Via the input and output interface 520, the route guidance section 515 performs route guidance to the destination via display or via audio, using either the derived route obtained from the server 1, or the derived route outputted by the route search section 513, or a corrected route resulting from the derived route outputted from the server device 1 or from the route search section 513 after correction by the route correction section 514.

Figure 2B:
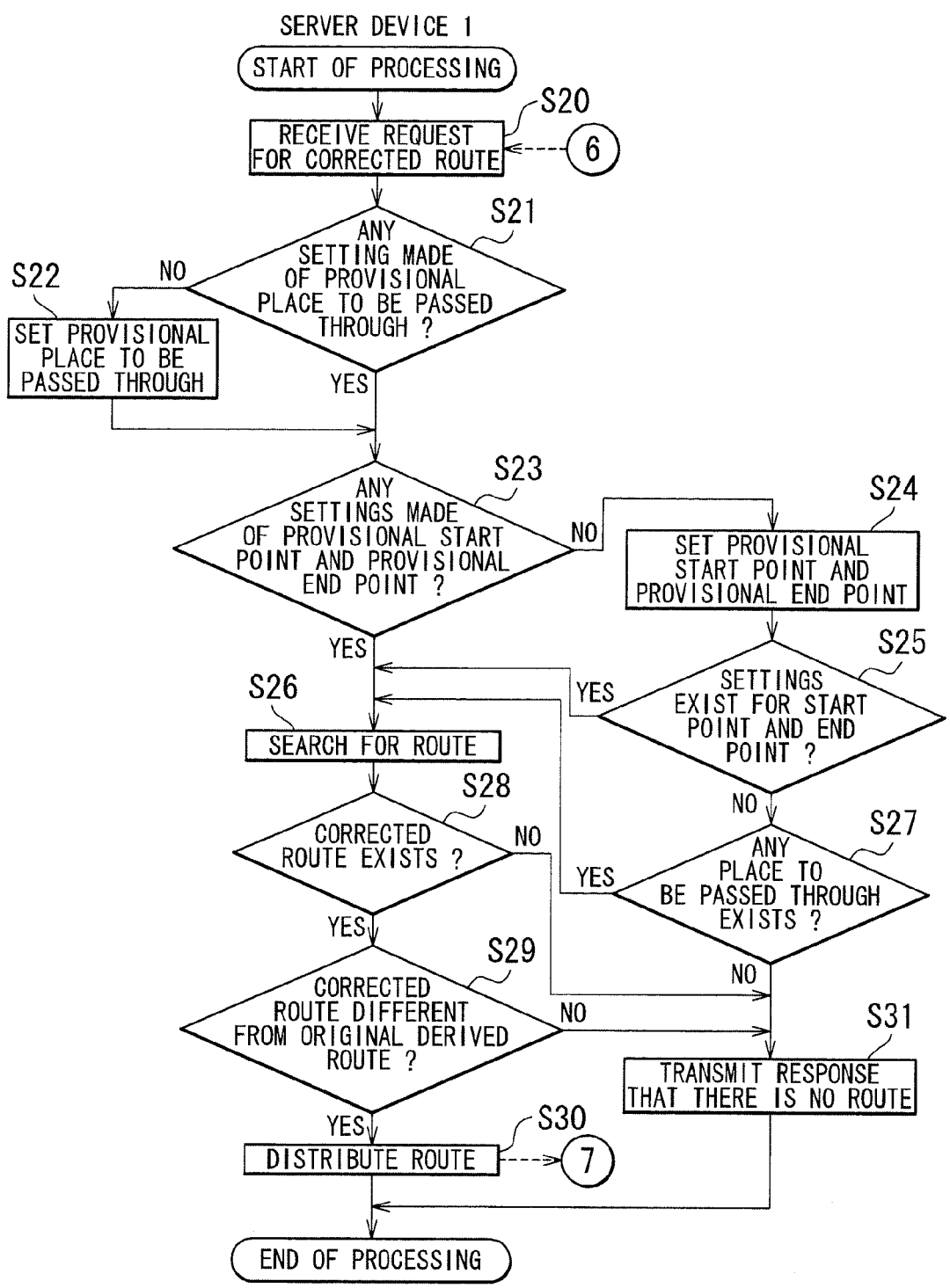

The overall processing flow of the route search system that includes the server device 1 and the navigation device 5 is shown in FIGS. 2A and 2B.

When, in the navigation device 5, the current position is acquired by the position information acquisition section 517 as the origin point, and a destination and search conditions and so on are inputted via the input and output interface section 520 (a step S200), then a derived route from the origin point to the destination is calculated by the route search section 513 (a step S201). The derived route that has thus been obtained is then displayed upon the display unit 52 of the navigation device 5 by the input and output interface section 520 (a step S202). This display is not limited to visible display; it would also be acceptable for a summary of the derived route (the ground points to be passed through or the names of the roads or the like) to be notified to the user by audio. If a plurality of these derived routes which are supplied to the user by display or by audio exist, one of the plurality of these derived routes is invited to be selected.

If the route that has been selected is a route that accords with the expectations of the user, then correction of this derived route is not requested by the user (NO in a step S203), and route guidance to the destination using this derived route is started (a step S211). However, if the derived route that has been selected is different from the route that the user anticipated, then correction of this derived route is requested by the user (YES in the step S203), and a route correction region is received related to a region within which a portion of the derived route should be included (the step S204).

The route correction region that is received in the step S204 is set by the user designating an area upon the map while he is looking at the map and at the derived route displayed upon the display unit 52. Instead of designating an area upon the map, it would also be acceptable for the route correction region to be set using the name of a city, a town, a county, a village, a ward, or the like. By the user pointing at some position upon the map or inputting the name of some road intersection or the name of some ground point, it would also be possible for a ground point or region that corresponds to this position upon the map, or some area within a predetermined distance (i.e. within some predetermined range) from the ground point or region corresponding to the name that has been inputted, to be set as the route correction region. The predetermined range within which the ground point or region designated in this manner is included is received in the step S204 as the route correction region.

When the route correction region has been set, one or more provisional places to be passed through are set within that route correction region (a step S205). A road that is often employed by this user, or a road having road attributes that resemble those of such a road, may be prioritized and set as a provisional place to be passed through. If the use of toll roads has been designated as a search condition in the step S200, then in a step S205 a place to be passed through is selected from among interchanges that are connection points to toll roads. A road or a ground point that is different from roads and ground points already included in the derived route may be set as a place to be passed through. If it has not been possible to set any place to be passed through in this step S205, then the fact that there is no place to be passed through (i.e. that no such place has been set) is included in the requested information of a subsequent step S207.

Next, a provisional start point and a provisional end point are set for calculation of a corrected route that passes through this route correction region (a step S206). Here, intersection nodes that are located in the vicinity of the ground points where the boundary line of the route correction region that has been set and the derived route intersect are preferentially set as the provisional start point and the provisional end point. In particular, along with setting a road or a ground point that is located in the vicinity of the boundary line of the route correction region and that is selected in order of closeness to the origin point as a provisional start point, such a road or such a ground point selected in order of closeness to the destination is also set as a provisional end point. If in this step S206 it has not been possible to set a provisional start point and a provisional end point, then the fact that there is no provisional start point and no provisional end point (i.e. that they have not been set) is included in the request information of the next step S207.

A corrected route request is created that includes the route correction region that was set in the step S204, the provisional place to be passed through that was set in the step S205, the provisional start point and the provisional end point that were set in the step S206, the derived route information from the origin point to the destination, the search conditions for the derived route and for the corrected route, and so on, and this corrected route request is transmitted to the server device 1 by the information request transmission unit 519 (the step S207).

It is also possible for the server device 1 to receive the route request from the navigation device 5, and for the route search section 15 to calculate a derived route to the destination by referring to the origin point (or the current position of the vehicle) included in that request, the destination, the search conditions, and so on. The sequence of processing in this procedure will be explained when the server device 1 has received, from the navigation device 5, a request for a corrected route including derived route information that has been calculated by the navigation device 5.

In the server device 1, a request for a corrected route is received by the terminal request reception section 14 (a step S20) and information about this request is transferred to the route condition setting section 16, and the route condition setting section 16 creates corrected route search conditions on the basis of the route correction region, the provisional place to be passed through, the provisional start point, and the provisional end point included in that request. The corrected route search conditions created by the route condition setting section 16 may be search conditions that are different from the search conditions that were used by the navigation device 5 when calculating the derived route from the origin point to the destination in the step S201. And, if no provisional place to be passed through has yet been set (NO in the step S21) in the information in the request, a provisional place to be passed through is set (in a step S22) in a similar manner to the step S205. This is because, even if no place to be passed through was set in the step S205, there is still a possibility that it will be possible to set a provisional place to be passed through that will be effective for calculation of a corrected route, by using the newest and moreover very voluminous information accumulated in the map database 18 and the external information database 13 that are maintained upon the server device 1.

If in the step S22 the conclusion is that no provisional place to be passed through has been set, then it is arranged to store a message to the effect that there is no provisional place to be passed through (i.e. that no such place has yet been set) on the basis of the information in the request. And, if on the basis of the information in the request, a provisional start point and/or a provisional end point have not yet been set (a step S23), then a provisional start point and a provisional end point are set in a similar manner to the step S206 (a step S24). In the same way as for the provisional place to be passed through, there is a possibility that it will be possible to set a provisional start point and a provisional end point that will be more effective for a corrected route, by using the newest and moreover very voluminous information maintained by the server device 1. If in the step S24 the conclusion is that no provisional start point and no provisional end point have been set, then it is arranged to store a message to the effect that there is no provisional start point and no provisional end point (i.e. that no such points have yet been set) on the basis of the information in the request. Here, if no provisional start point and provisional end point are set (NO in a step S25), and moreover no provisional place to be passed through has yet been set (NO in a step S27), then the route information supply section 17 generates response information to the effect that there is no corrected route, and transmits this information to the navigation device 5 via the communication interface section 11 (a step S31).

However, if the result in any of the steps S23, S25, or S27 is YES, in other words if both a provisional start point and a provisional end point and also a place to be passed through are set, or if a provisional start point and a provisional end point have been set even though no place to be passed through has yet been set, then the route search section 15 searches for a corrected route using the search conditions that have been set by the route condition setting section 16 (a step S26).

If a corrected route has been found (YES in a step S28), and if, on the basis of the information in the request, this corrected route is different from the derived route that was obtained (YES in a step S29), then the route information supply section 17 generates response information that includes corrected route information, i.e. that includes the above search result. This response information that has been generated is then transmitted to the navigation device 5 via the communication interface section 11 (a step S30). But if no corrected route has been found (NO in the step S28), or if the corrected route is the same as the derived route (NO in the step S29), then response information to the effect that there is no corrected route is transmitted to the navigation device 5.

The navigation device 5 receives the response information to the derived route request from the server device 1 (a step S208), and, if a corrected route is included in that response information (YES in a step S209), then a decision is made as to whether or not this corrected route has been selected by the user (a step S2095). If the corrected route has been selected by the user (YES in the step S2095), then the portion of the derived route that was calculated in the step S201 is replaced by that corrected route (a step S210). But if the corrected route is not selected by the user and an instruction for re-correction is issued (NO in the step S2095), then the flow of control returns to the step S207. If no corrected route exists (NO in the step S209), then route guidance to the destination is performed using the initial derived route. At this time, the fact that no corrected route was found and that guidance to the destination will be performed with the current derived route is notified to the user via the input and output interface section 520, and guidance is started after having confirmed the intention of the user.

Guidance is continued until the current position of the vehicle, as acquired from the position information acquisition section 517, almost coincides with the destination (NO in a step S212), and then guidance is terminated at the time point that the current position of the vehicle has arrived in the vicinity of the destination (YES in the step S212).

The way in which the provisional point to be passed through is set, the method for setting the provisional start point and the provisional end point, and the method for correcting the route, will be explained in more concrete terms using FIGS. 3, 5, and 7, as will be detailed hereinafter.

The above procedure assumes a service in which the server device 1 supplies the corrected route according to a route request from the navigation device 5. However, when a user is making a travel plan at home or en route using, as a terminal device, not a navigation device, but a personal computer or a mobile telephone or the like, it would also be possible to arrange for the personal computer or the mobile telephone or the like to request the server device 1 to provide a derived route to the destination. In this case, the route correction section 514 would be provided in the server device 1. In the server device 1, the derived route found by the route search section 15 is supplied to the user of the terminal such as a mobile telephone or the like by the route information supply section 17, a request for correction of the derived route that has been supplied is received from the user of the terminal, and the route search section 15 calculates a corrected route according to that request. And the route correction section 514 corrects the derived route with the corrected route that has been obtained by calculation by the route search section 15, and then the corrected derived route is transmitted to the user of the terminal.

Moreover, it would also be acceptable to arrange for the procedure for calculating the corrected route to be executed by the navigation device 5, and for the corrected route to be calculated by the route search section 513 and the derived route to be corrected, even if the navigation device 5 is not connected to the server device 1.

Figure 3:
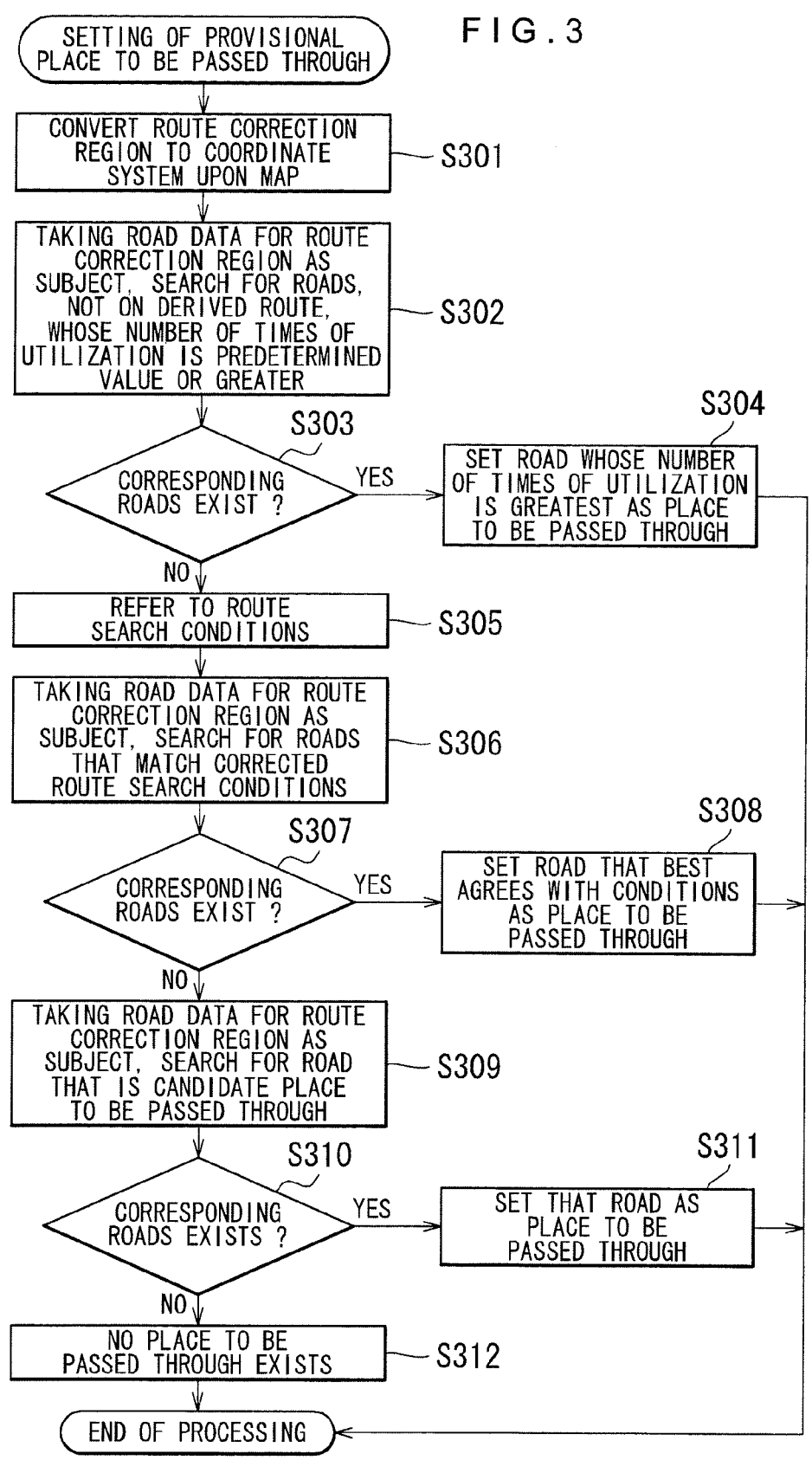
Figure 4:
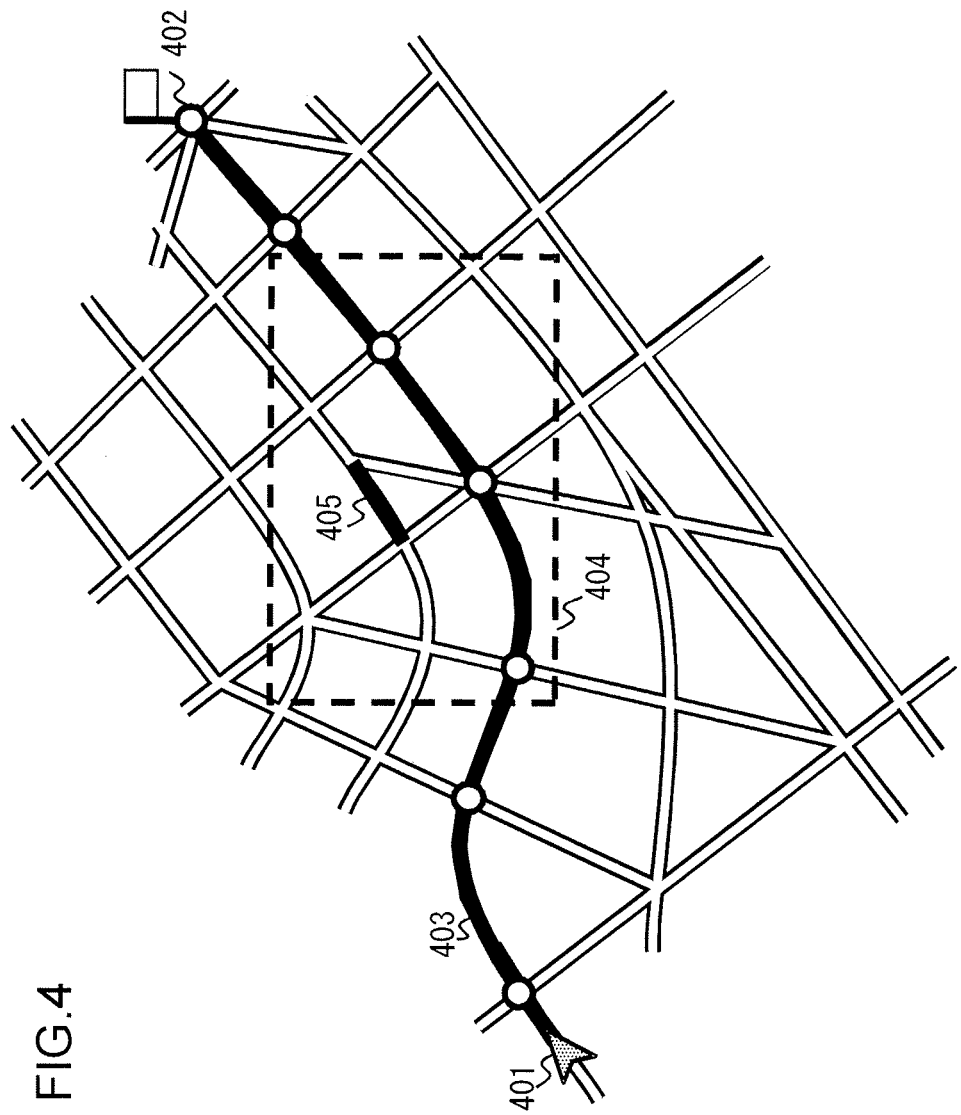

FIG. 3 shows the flow of the procedure performed by the navigation device 5 or by the server device 1 for setting a provisional place to be passed through. Here, the explanation will suppose that this processing is performed by the navigation device 5 in the step S205. And FIG. 4 is a supplementary figure for explanation of the processing flow of FIG. 3, and shows a map screen that is displayed upon the display unit 52 of the navigation device 5. The method for setting a provisional place to be passed through will now be explained with reference to FIGS. 3 and 4.

The route correction region (upper and lower boundaries and left and right boundaries, or the like) that was set in the step S204 is read in, and, if the route correction region is set in terms of latitude and longitude or in terms of the coordinate system upon the display screen, then this route correction region that has been set is converted into the coordinate system of the map database managed by the navigation device 5 (a step S301). Next, the derived route that was calculated in the step S201 is read in, and, for roads or ground points (for example intersections) that are present within the route correction region, as search conditions, being a road that is not included in the derived route and being a road whose number of times of utilization by an unspecified large number of vehicles (i.e. frequency of being traveled) is high are set, and the map database 518 is searched (a step S302). While the method of the number of times a road has been utilized being included in the map database 518 is assumed, it would also be possible to utilize a method according to which this is acquired from an external medium or from the server device 1, and is stored in the storage unit 56 as number of times of road utilization data. At this time, for the road number of times utilization data, it would be arranged for the number of times that a road has been utilized to be acquired by comparison with the road numbers stored in the map database 518.

If in the step 302 one or more roads or ground points (such as intersections or the like) that match the search conditions have been detected (YES in a step S303), then, among these, the road that has been utilized the greatest number of times is selected as the place to be passed through (a step S304). But if no corresponding road or ground point has been found (NO in the step S303), then the corrected route search conditions are referred to (in a step S305), and these route search conditions are added to the search conditions and the map database 518 is searched (a step S306). For example, when road attributes such as having some road classification such as that of national road, that of county road, that of general road, or that of minor road, being a wide road, being a road with a large number of lanes, being a road with a large number of establishments beside it, being a road that can be utilized at a discount, being a road upon which congestion is not occurring, being a road upon which the number of accidents that occurs is low, or the like are designated as route search conditions, then those road attributes may be used as search conditions for the map data.

If in this step S306 one or more roads or ground points (such as intersections or the like) that match the search conditions have been detected (YES in a step S307), then, among these, the road with the largest number of establishments beside it or the road that can be utilized at the greatest discount or the like, that best matches the search conditions, is selected as the place to be passed through (a step S308). At this time, it would also be acceptable to rank the search results according to the search conditions, and to select the ground point such as the road or intersection or the like for which the average value of its ranking is the best (i.e. is the smallest). In this case, it would be designated in advance by the user which conditions should be prioritized for selecting the place to be passed through.

But if no corresponding data has been found (NO in the step S307), then being a road or ground point (such as an intersection or the like) that has been set in advance as a candidate place to be passed through is set as the search condition, and searching of the map database 518 is performed (a step S309). If a corresponding road or ground point has been found (YES in a step S310), then this road or ground point is set as the place to be passed through (a step S311). But if no such corresponding road has been found (NO in the step S310), then it is set that there is no place to be passed through (a step S312), and processing terminates. It is considered that such cases in which no place to be passed through can be found may be when no roads other than the derived route are present within the route correction region, or when no roads exist within the route correction region, or the like.

In FIG. 4 there are shown, upon a sample map, an icon 401 marking the origin point (that is the current position of the vehicle) of a derived route 403 that constitutes the current subject for correction, and an icon 402 that marks the destination. Furthermore, a route correction region 404 that has been set via the route correction region reception section 204 is also shown upon this map. With the input and output interface section 520, the user selects the route correction region 404 to be a rectangular region as shown in FIG. 4. It would be acceptable to arrange for the user to be able to select the route correction region to be some shape other than rectangular, such as the region defined by a named city or county or ward or village or the like, and it would also be acceptable to arrange for it to be possible for him to select from the route 403 a section of the route 403 that he wishes to correct by surrounding it with straight lines. If the route selection region 404 has been selected by some method other than by surrounding it with a rectangle, then, for example, a rectangular route correction region 404 may be created so as to include this position that has been selected. While it would also be possible to deal with a circular route correction region 404 or indeed with a region of any desired two-dimensional shape, in this embodiment, the explanation will be given in terms of the route correction region 404 being shaped as a rectangular region, because handling a rectangular region is faster in terms of the time period required for searching and in terms of the ease of processing. In FIG. 4, a place to be passed through 405 that has been set in this route correction region 404 according to the procedure described in FIG. 3 is displayed.

Figure 5:
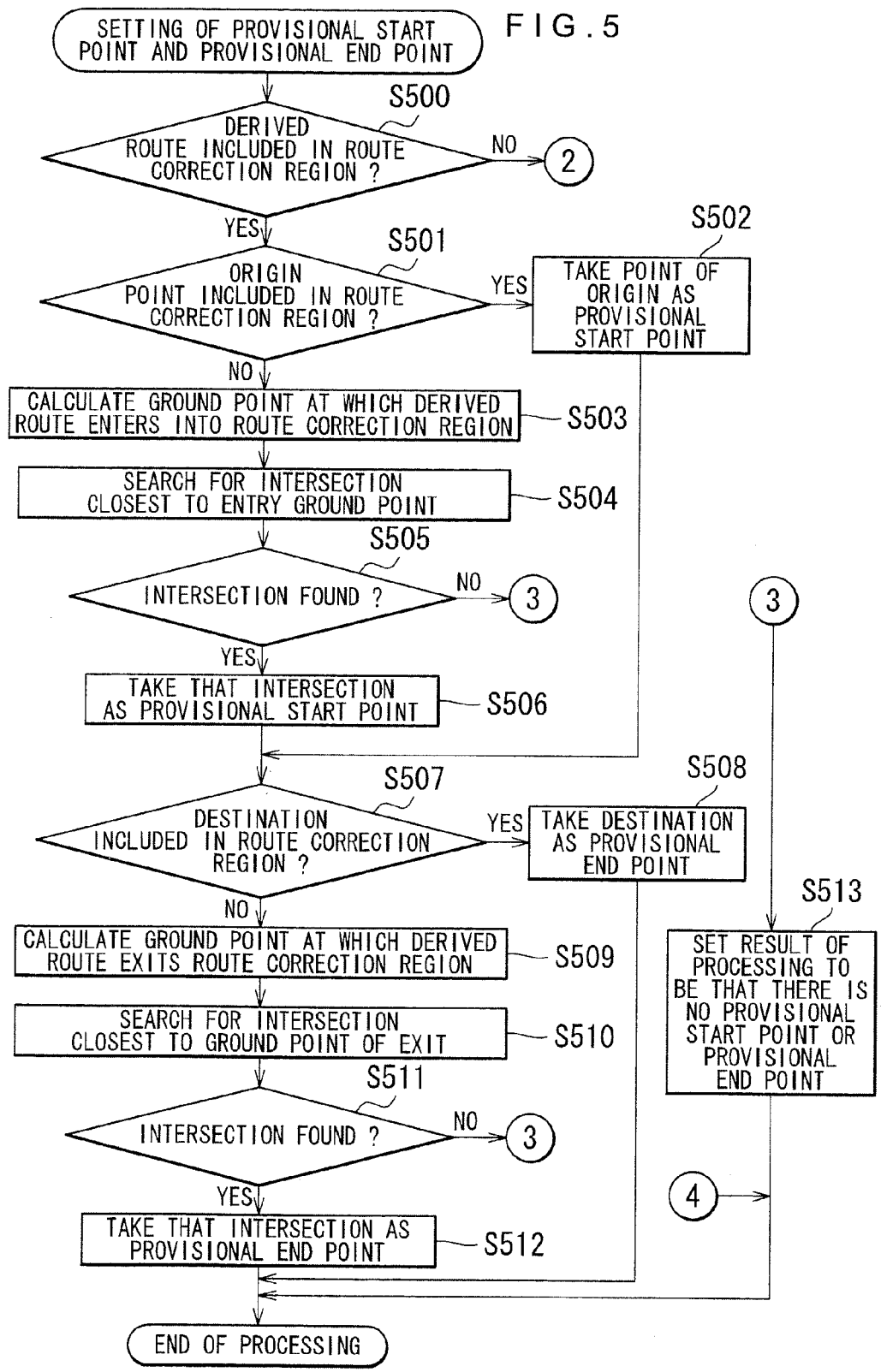
FIG. 5 is a figure showing a processing flow for setting a provisional start point and a provisional end point.
Figure 6:
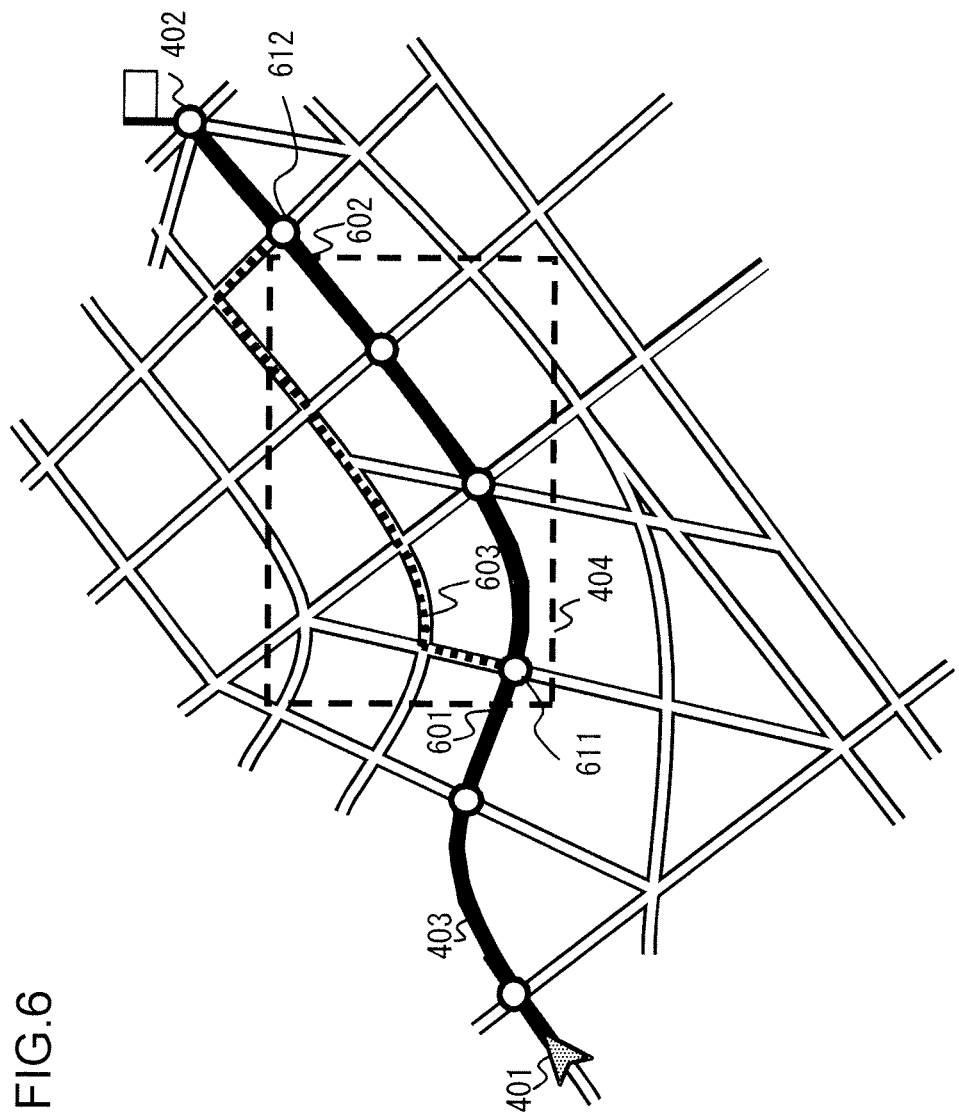
FIG. 6 is a supplementary figure for further explanation of this processing flow for setting a provisional start point and a provisional end point.

FIG. 5 shows the processing flow of a procedure that is executed by the navigation device 5 or by the server device 1 for setting of a provisional start point and a provisional end point. Here, by way of example, the processing performed by the navigation device 5 in the step S206 will be explained. And FIG. 6 is a supplementary figure for explanation of the processing flow of FIG. 5. The way in which a provisional start point and a provisional end point are set will now be explained with reference to FIGS. 5 and 6.

First, a decision is made as to whether or not the derived route that was calculated in the step S201 is included in the route correction region that was set in the step S204, and if it is not so included (NO in a step S500), then the flow of control is transferred to a step S700. The processing of the step S700 and subsequently will be described hereinafter. But if this derived route is included in that route correction region (YES in the step S500), then a decision is made as to whether or not the origin point is included in that route correction region, and if the origin point is so included (YES in a step S501), then this origin point is taken as being the provisional start point for searching for a corrected route (a step S502). However, if the origin point is not included in that route correction region (NO in the step S501), then the ground point at which the derived route enters into the route correction region is calculated (a step S503), and, among the intersections that are included in the derived route, the intersection that is closest to that entry ground point is searched for (a step S504). If a plurality of these ground points at which the derived route enters into the route correction region exist, then the intersection that is closest to the ground point at which the derived route initially enters is found. If such a corresponding intersection is found (YES in a step S505), then this intersection is taken as being the provisional start point (a step S506). But if no such intersection that matches the conditions can be found (NO in the step S505), then this processing result is set to the fact that there is no provisional start point or no provisional end point (a step S513), and processing terminates.

Next a decision is made as to whether or not the destination of the derived route is included within the route correction region, and if the destination is thus included (YES in a step S507), then this destination is taken as being the provisional end point (a step S508). But if the destination is not included in the route correction region (NO in the step S507), then the ground point at which the derived route exits from the route correction region is calculated (a step S509), and, among the intersections that are included in the derived route, the intersection that is closest to that ground point of exit is searched for (a step S510). If a plurality of these ground points at which the derived route exits from the route correction region exist, then the intersection that is closest to the ground point at which the derived route finally exits is found. If such a corresponding intersection is found (YES in a step S511), then this intersection is taken as being the provisional end point (a step S512). But if no such intersection that matches the conditions can be found (NO in the step S511), then this processing result is set to the fact that there is no provisional start point or provisional end point (the step S513), and processing terminates.

While in this procedure intersections that matched the conditions were searched for in the steps S504 and S510, it would also be possible to search for roads instead of intersections, and, in the steps S506 and S512, to set any suitable ground points upon the roads that have been found (such as shape interpolation points for those roads, or the like), or intersections to which those roads connect, as being the provisional start point and the provisional end point.

In FIG. 6, the ground point 601 calculated in the step S503 at which the derived route 403 enters into the route correction region 404 is shown on the map. And the intersection 611 included in the derived route 403 that is the closest intersection to that entry ground point 601, and that is set in the step S504, is the provisional start point for calculation of the corrected route. Moreover, in FIG. 6, the ground point 602 calculated in the step S509 at which the derived route 403 exits from the route correction region 404 is shown on the map. And the intersection 612 included in the derived route 403 that was set in the step S510 as being included in the derived route 403, and moreover was set as being the closest intersection to that ground point of exit 602, is the provisional end point for calculation of the corrected route.

And, by a route request in which the provisional start point and the provisional end point that have been set are included being transmitted to the server device 1 (the step S207), a corrected route 603 is obtained from the server device 1.

Figure 7:
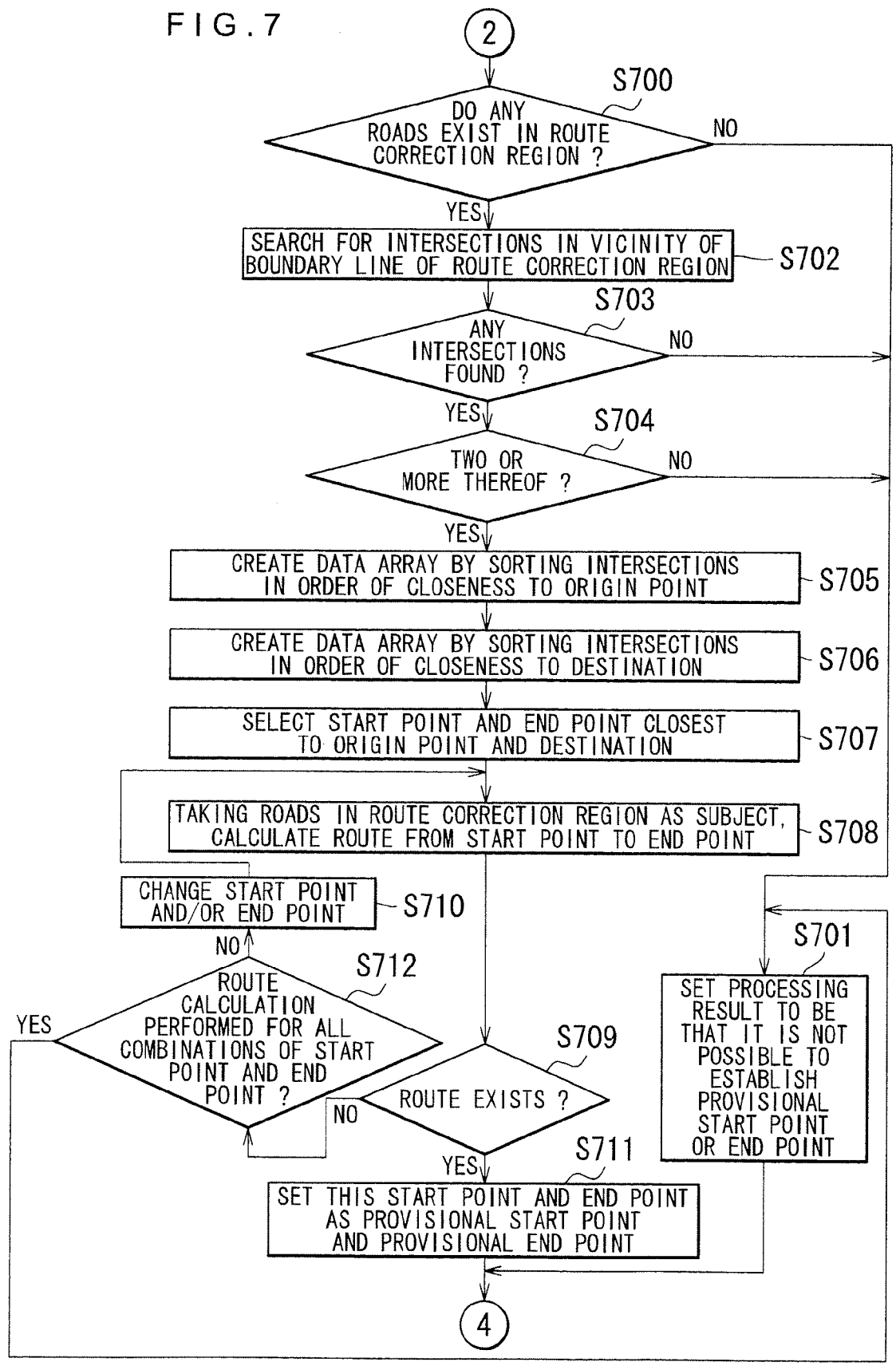
FIG. 7 is another figure showing a different portion of the processing flow for setting a provisional start point and a provisional end point.
Figure 8:
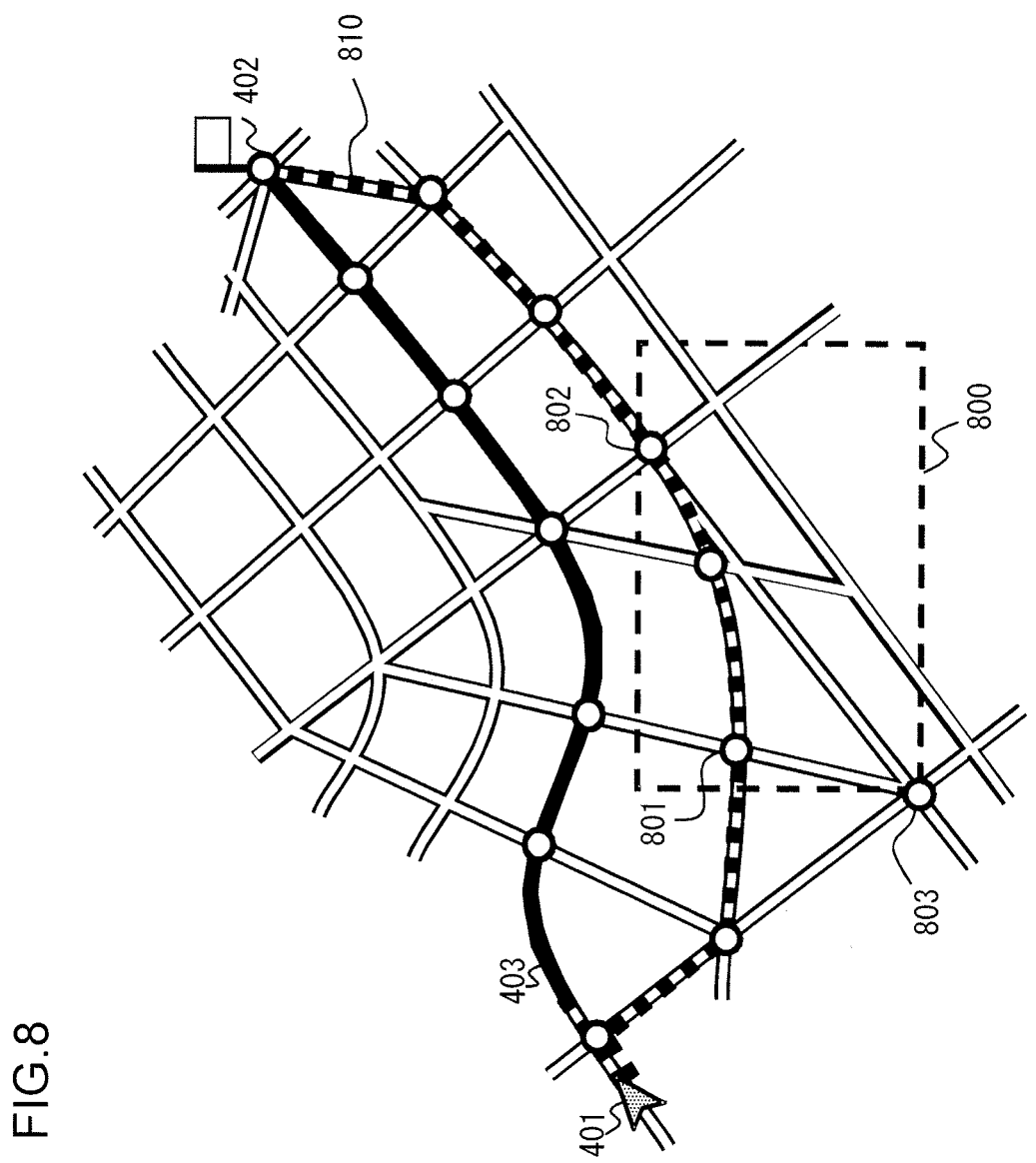
FIG. 8 is a supplementary figure for further explanation of this different portion of the processing flow for setting a provisional start point and a provisional end point.

FIG. 7 shows the flow of processing of another procedure executed by the navigation device 5 or the server device 1 shown in FIG. 5 for setting a provisional start point and a provisional end point, and shows the flow of processing of a procedure for setting a provisional start point and a provisional end point if the derived route calculated in the step S201 is not included in the route correction region set in the step S204 (NO in the step S500). And FIG. 8 is a supplementary figure for explanation of the processing flow of FIG. 7. The way in which a provisional start point and a provisional end point are set will now be explained with reference to FIGS. 7 and 8.

First, the map database 518 is searched in order to determine whether or not any roads exist within the route correction region, and if no roads exist in the route correction region (NO in a step S700), then the result of this processing is set to the fact that it has not been possible to set a provisional start point and a provisional end point (a step S701). But if at least one road does exist in the route correction region (YES in the step S700), then intersections that are positioned in the vicinity of the boundary line of the route correction region are searched for in the database 518 (a step S702). If no intersection that matches these conditions can be found (NO in a step S703), then the step S701 is executed and processing terminates. But if at least one intersection has been found that matches these conditions (YES in the step S703), and if the number thereof is two or more (YES in a step S704), then a data array of provisional start point candidates is created (a step S705) by sorting these intersections in order of closeness to the origin point (i.e. according to shortness of their distance therefrom), and also a data array of provisional end point candidates is created by sorting the intersections in order of closeness to the destination (a step S706).

One candidate is selected from each of these two data arrays, in other words one candidate from the data array of provisional start point candidates and one candidate from the data array of provisional end point candidates, thus providing a pair of a start point and an end point (a step S707), and a route is calculated from that start point to that end point while taking the road data in the route correction region as the subject (a step S708). If a route is found (YES in a step S709), then this start point and this end point are set as the provisional start point and the provisional end point (a step S711), and processing terminates. But if no route is found (NO in the step S709), then the pair of the start point and the end point is changed (a step S710) and the steps S708 and S709 are executed, until all combinations of the start points and the end points registered in the above two array tables have been tried (a step S712). And if no route has been found for any one of all the combinations of start point and end point (NO in the step S712), then the step S701 is executed and processing terminates.

Here, in the step S710, pairs of a start point and an end point are selected in the order in which they are registered in the data arrays. In other words, the start point is set to intersections in the order of their closeness to the origin point, and similarly the end point is set to intersections in the order of their closeness to the destination. Since, in this processing, the calculation of a route from the start point to the end point is performed in the process of setting the provisional start point and the provisional end point, accordingly it is also possible to utilize this route as the corrected route after this processing has been executed. In this case, after having executed the processing in the step S206, the flow of control would proceed to the step S209. When this processing has been executed in the step S24, it is confirmed in the step S25 that the start point and the end point have been set, and if they have been set then the flow of control proceeds to the step S30.

It should be understood that while, in this processing, intersections that are located in the vicinity of the boundary line of the route correction region were searched for in the step S702, alternatively it would also be acceptable to search for roads instead of intersections. In this case, in the step S702, the start point and the end point would be selected from ground points upon the roads (interpolation points that make up the roads, or the like) or from intersections to which those roads connect.

In the above, by this procedure, it is arranged to set a provisional start point and a provisional end point for obtaining a route that passes through the designated route correction region. By setting this provisional start point and this provisional end point, and also the provisional place to be passed through, the probability is enhanced of obtaining a corrected route that passes through the road or ground point through which the user wishes to pass.

FIG. 8 shows upon the map a route correction region 800 that is set in a region in which the derived route 403 is not present, and also intersections 801, 802, and 803 that have been found by the step S703 to be intersections that are located in the vicinity of the boundary of this route correction region 800. Using these intersections 801, 802, and 803 that have been found, along with generating the data array of provisional start point candidates in the step S705, sorted in order of closeness to the origin point 401, also the data array of provisional end point candidates is generated in the step S706, sorted in order of closeness to the destination 402. A provisional start point is selected from the provisional start point candidate data array in order of closeness to the origin point and a provisional end point is selected from the provisional end point candidate data array in order of closeness to the destination, and a route is calculated from that provisional start point to that provisional end point. Upon such a route being found, the provisional start point 801 and the provisional end point 802 are set. The corrected route from the provisional start point 801 to the provisional end point 802 is supplied from the server device 1 to the navigation device 5, and a new derived route 810 is obtained by route correction in the step S210 of FIG. 2A.

Figure 9:
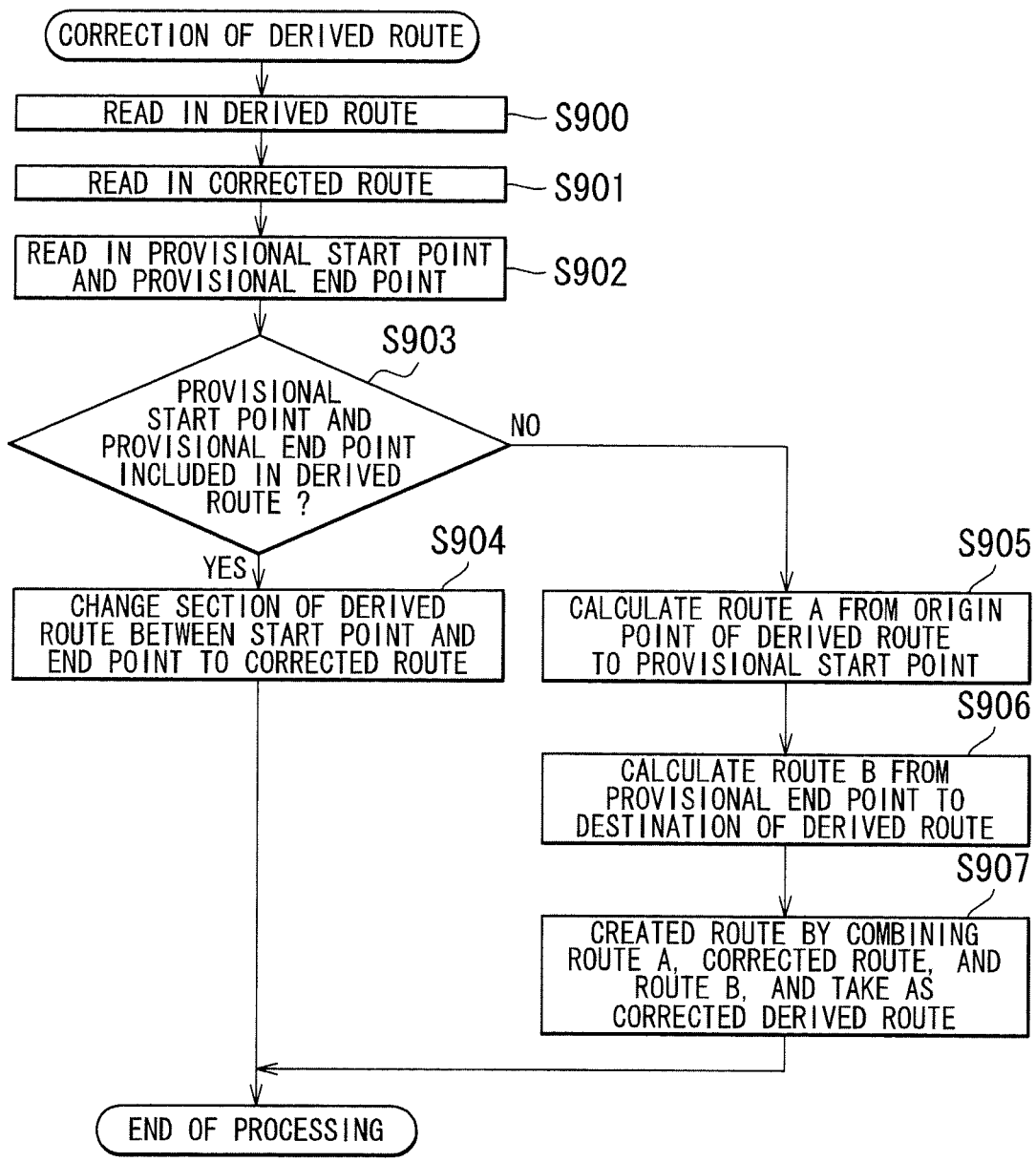
FIG. 9 is a figure showing a processing flow for correcting a derived route.

FIG. 9 shows the processing flow of a procedure (performed in the step S210 of FIG. 2A) for route correction processing, in which the derived route is corrected by the navigation device 5 using the corrected route that has been obtained from the server device 1.

The navigation device reads in the derived route that is stored in the storage unit 516 (a step S900), and also reads in the corrected route that has been received from the server device 1 and that is stored in the storage unit 516 (a step S901). Then the provisional start point and the provisional end point that were used for creating this corrected route are read in (a step S902), and, if this provisional start point and this provisional end point are included in the derived route (YES in a step S903), then the section of the derived route from the provisional start point to the provisional end point is changed to the corrected route (a step S904). But if the provisional start point and the provisional end point are not included in the derived route (NO in the step S903), then a route A from the origin point of the derived route to the provisional start point is calculated (a step S905), a route B from the provisional end point to the destination of the derived route is calculated (a step S906), a route is created by combining this route A, the corrected route, and this route B, and this is taken as being the corrected derived route (a step S907).

When the processing explained in connection with FIG. 7 is executed and the provisional start point and the provisional end point are set, if the decision in the step S903 is NO, then the flow of control proceeds to the step S905. When the steps S905, S906, and S907 are described in concrete terms using the route shown in FIG. 8, the route A corresponds to the section of the route from the origin point 401 to the provisional start point 801, the corrected route corresponds to the section of the route from the provisional start point 801 to the provisional end point 802, and the route B corresponds to the section of the route from the provisional end point 802 to the destination 402. These route sections are connected together, and thereby a derived route 810 is obtained by correcting the initial derived route 403.

When the route is corrected by the route correction processing (in the step S210), guidance information is generated for guiding the vehicle to the destination using the corrected route. As such guidance information, information about ground points for guidance such as lane guidance shortly before a right turn or a left turn and directional guidance for turning left or right and the like, information required for guidance relating to ground points and roads in the vicinity of the route, and so on is created by referring to the map database 518.

While, in this embodiment, the processing for correction of the derived route is executed by the navigation device 5, it would also be acceptable to arrange for the correction of the derived route to be performed by the server device 1, and for it to transmit the result to the navigation device 5. Since by this arrangement the processing in the steps S905 and S906 is executed by the server device 1 that possesses the newest and moreover the most voluminous information, accordingly it becomes possible to be able to supply a derived route that better accords with the expectations of the user.

Figure 10:
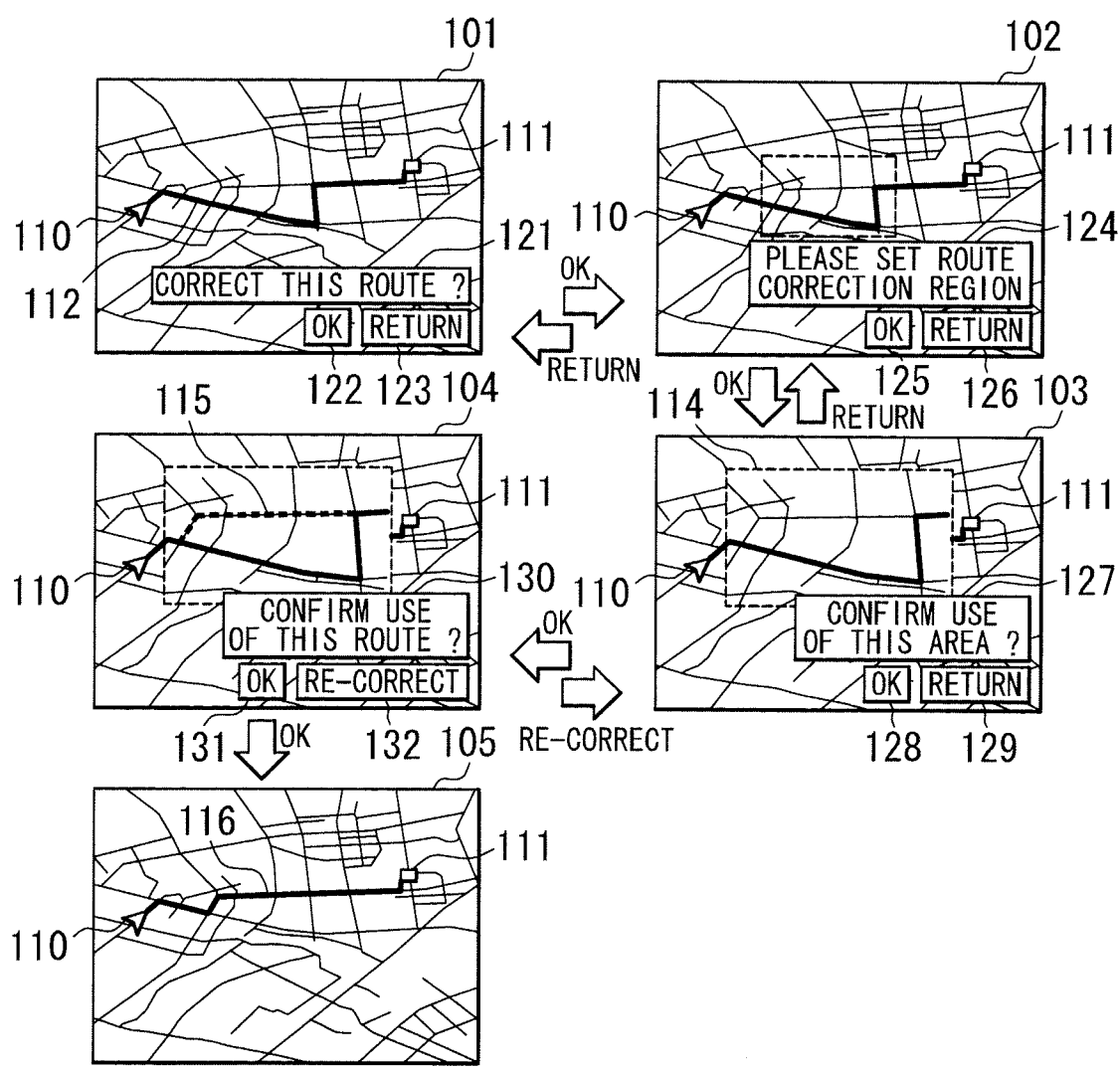
FIG. 10 is an example of display screens displayed upon a display unit during correction of a derived route.

FIG. 10 is an example of display screens that are displayed by the navigation device 5 upon the display unit 52 during correction of the derived route. FIG. 10 will now be explained in the following with consideration being given to the ways in which these screens correspond to FIGS. 2, 3, 5, and 7.

The display screen 101 is a screen in which, in the step S202, a derived route from an origin point 110 to a destination 111 that was calculated in the step S201 is displayed upon a map. If the region 122 in which "OK" is being displayed is selected as a reply to the message 121 "CORRECT THIS ROUTE ?" that is being displayed on this display screen 101, then in the step S203 it is decided that a route correction request has been issued, and the display changes over to a display screen 102 for reception of the route correction region. But if the region 123 in which "RETURN" is being displayed is selected, then in the step S203 it is decided that no route correction request has been issued, and the flow of control is transferred to the step S211 and route guidance according to the derived route 112 is performed.

When the route correction region 113 is designated in response to the message 124 "PLEASE SET ROUTE CORRECTION REGION" that is now being displayed on this display screen 102, and the region 125 in which "OK" is being displayed is selected, then input of the route correction region 113 is received in the step S204. But if the region 126 in which "RETURN" is being displayed is selected, then the display returns to the display screen 101. When input of the route correction region 113 is received, the display changes over to a confirmation screen 103 for the user to confirm the route correction region that has been selected, and a region 114 is displayed that is an enlarged display of the map of the route correction region and the route in it, so that the user can check them simply and easily, and the message 127 "CONFIRM USE OF THIS AREA ?" is also displayed.

If the region 114 is designated in response to this message 127 that has been displayed upon the confirmation screen 103, and the region 128 in which "OK" is being displayed is selected, then the route correction region 113 is confirmed, and, after the steps S207 and S208, the display changes over to a display screen 104 for confirmation of the corrected route 115 that has been acquired. But if the region 129 in which "RETURN" is being displayed is selected, then the display returns to the display screen 102. When the region 131 in which "OK" is being displayed is selected in response to the message 130 "CONFIRM USE OF THIS ROUTE ?" that has been displayed upon this display screen 104, then it is decided that the agreement of the user to the corrected route 115 has been obtained, and the display changes over to a display screen 105 on which is displayed the derived route 116 that has been corrected in the step S210 on the basis of this corrected route 115.

But if the region 132 in which "RE-CORRECT" is being displayed is selected on the display screen 104, then the flow of control returns to the step S207, and re-searching for another corrected route is implemented. In this case, it is ensured that a provisional place to be passed through and a provisional start point and a provisional end point are selected so that the corrected route that is selected is different from the derived route 112 and the corrected route 115. If the provisional place to be passed through is re-selected, for the provisional place to be passed through, in the step S302, S306, or S309 of FIG. 3, the road that best matches the search conditions is selected, but excluding the provisional place to be passed through that was used in the previous search for the corrected route 115. And, if the start point and the provisional end point are re-selected, for the provisional start point and the provisional end point, in the step S501, S504, S507, S510, or S707 the ground points that best match the search conditions are selected, but excluding the provisional start point and the provisional end point that were used in the previous search for the corrected route 115.

Since in the above, according to this embodiment, when a section of a derived route to be corrected has been designated, the navigation device 5 calculates a new route only for the neighborhood of the route correction region that has been designated, accordingly the user becomes able to change a portion of the derived route that does not accord with his expectations for the derived route, without clearly designating any alternative route or any place to be passed through upon an alternative route. Moreover, since the route is only partially changed (corrected) on the basis of the derived route that has already been calculated, accordingly it becomes possible to supply an alternative route that is close to the route that the user anticipates, because the route is not changed in the portions that the user does wish to travel along.

In other words, according to the present invention, for a road section on the derived route along which the user does not wish to travel, this route search device is able to change the derived route without forcing the user clearly to select an alternative route or a place to be passed through upon the alternative route. Furthermore, since no change is made to the portions of the route along which the user wishes to travel, accordingly this route search device is able to change the derived route to an alternative route that is close to the one that the user anticipates and expects.

Moreover, by the derived route being corrected using the corrected route that is supplied from the server device 1, it is possible to search for a corrected route that reflects the newest information possessed by the server device 1, such as traffic information or the state of utilization of facilities, or event information or the like. Furthermore, it is possible to search for a corrected route in which far more information about various conditions can be taken into account than just the information possessed by the navigation device, such as, for example, a great number of routes based upon travel data from a considerable number of vehicles, or routes or facilities recommended by drivers, or the like. Accordingly, the route that is supplied is more likely to be one that matches the anticipations of the user.

Yet further, even if the user does not take the trouble to look at the fine details of the derived route or of the surrounding map, it is arranged for him to be able to correct the derived route simply and easily on the basis of the shape of the derived route, or on the basis of the display color that indicates a mountainous region, a coastal region, an urban area or the like, or on the basis of the display of elevation or the like, by choosing a section that he wishes to change according to his desires just by designating one partial section of the derived route that he wishes to correct.

Since the server device 1 only distributes to the navigation device 5 route information for the section that the user wishes to correct, accordingly it is possible to reduce the amount of information that is distributed, and it is possible for the navigation device 5 to correct the derived route in a short period of time.

Figure 11A:
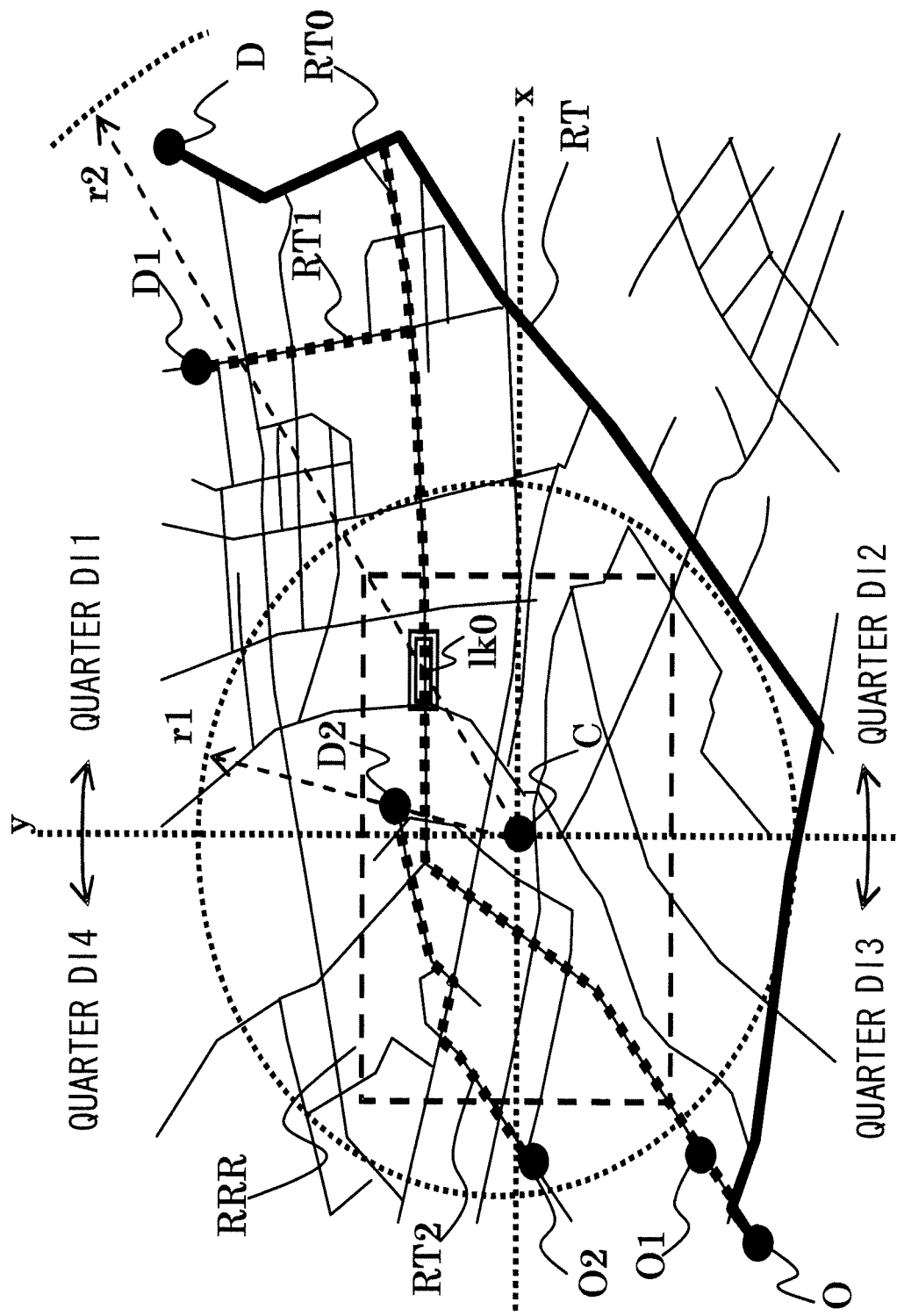
Figure 11B:
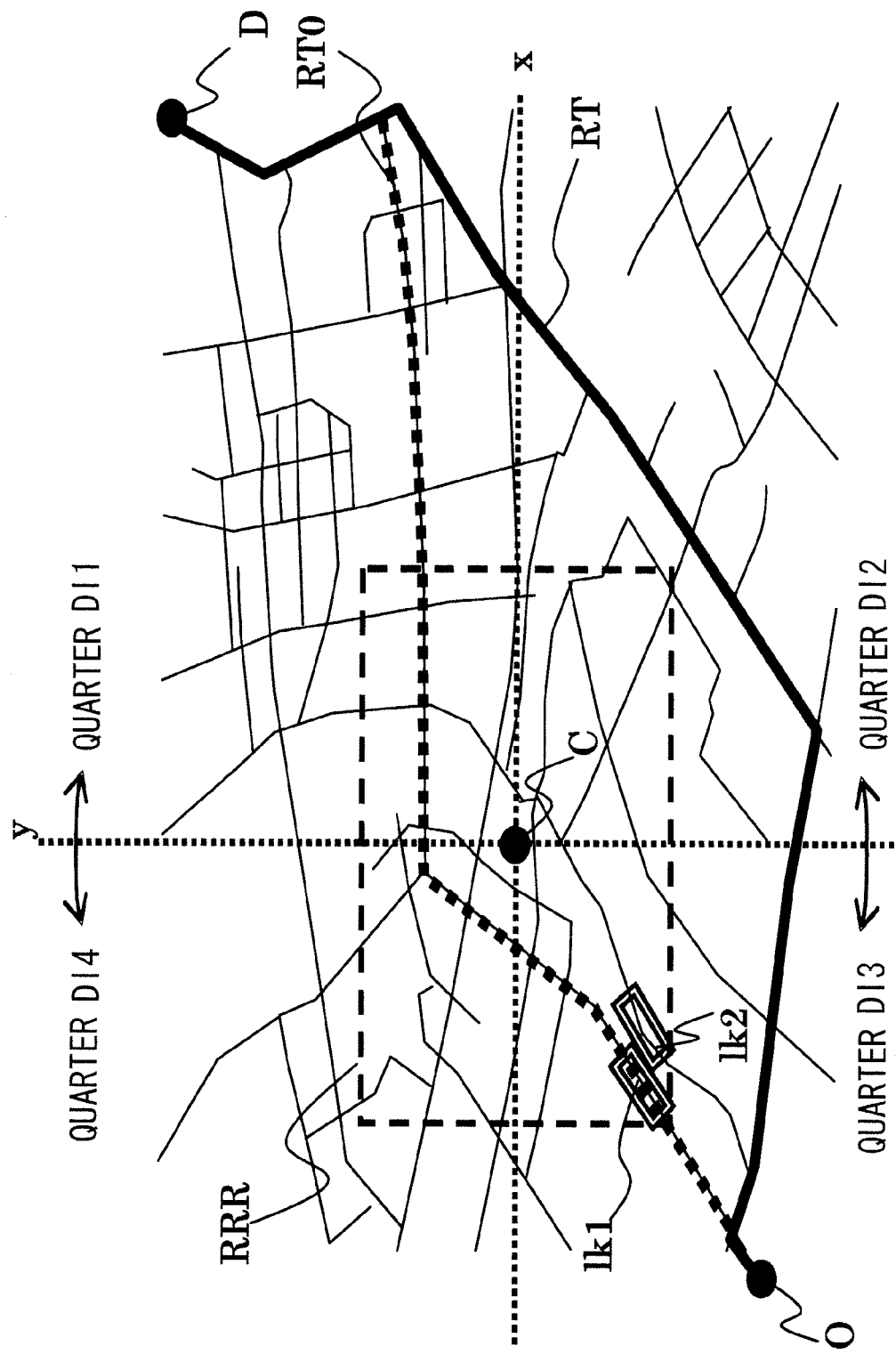

As described above, the provisional place to be passed through is searched according to search conditions related to the number of times of utilization of roads or according to the attributes of roads. A concrete example of this will now be explained with reference to FIGS. 11A and 11B. Each of FIGS. 11A and 11B is a figure for explanation of an example of the processing for selection of a provisional place to be passed through. In each of FIGS. 11A and 11B, there is shown a road map including an initial derived route RT from an origin point O to a destination D that has been found in the step S201 of FIG. 2A. The route correction region RRR that was received in the step S204 of FIG. 2A is shown by the rectangular region surrounded by the broken line. The road map is divided up into four quarters DI1, DI2, DI3, and DI4 that correspond to the four directions from the center point C by mutually orthogonal X and Y coordinate axes at the center point C of this route correction region RRR. It should be understood that, if the route correction region RRR is an asymmetric region, then it would be acceptable to arrange for the point at the barycenter of this route correction region RRR to be the point of intersection of the X axis and the Y axis.

FIG. 11A is a figure for explanation of an example of the search processing for finding a provisional place to be passed through when the searching is performed according to search conditions related to the number of times of utilization of roads. Probe data for through routes is gathered from a plurality of vehicles by a probe data management center not shown in the figures, and the number of times of utilization of the road of each section by that plurality of vehicles is counted. This count of the number of times of utilization may, for example, be the number of vehicles that pass each road section in a unit period of time. The counted number of times of utilization is stored in a database in correspondence with information specifying the combinations of origin points and destinations of the vehicles. By doing this, it is possible to obtain road sections used by a large number of vehicles that have been traveling in the same direction as the subject vehicle.

In FIG. 11A, the route from the origin point O to the destination D is a route from the quarter DI3 to the quarter DI1. The probe data management center searches in the route correction region RRR for combinations of origin point and destination that correspond to routes from the quarter DI3 to the quarter DI1, and obtains, for each road section, a total value for the number of times of utilization corresponding to each of those combinations. However, the combinations of origin point and destination searched through here that correspond to routes from the quarter DI3 to the quarter DI1 are limited to combinations that satisfy predetermined conditions. For example, of the destinations found from the database corresponding to numbers of times of utilization, referring to FIG. 11A, a destination D1 that is positioned within a range that is greater than a distance r1 and moreover not more than a distance r2 may be included in the subjects of the search, while a destination D2 that is not positioned within this range is not included in the subjects of the search.

While this feature is not shown in the figures, the same is true for the origin point. For example, of the origin points found from the database corresponding to numbers of times of utilization, referring to FIG. 11A, an origin point that is positioned within a range that is greater than a distance r3 and moreover not more than a distance r4 may be included in the subjects of the search, while an origin point that is not positioned within this range is not included in the subjects of the search. If, in order to make the explanation simple, the distance r3 is equal to the distance r1 and moreover the distance r4 is equal to the distance r2, then, in FIG. 11A, the origin point O1 is included in the subjects of the search, while the origin point O2 is not included in the subjects of the search. Both the route RT from the origin point O to the destination D and the route RT1 from the origin point O1 to the destination D1 are routes of almost the same distance, and this distance is quite long. It is considered that a vehicle that travels along a route of this sort that is quite long distance will, in the route correction region RRR that is enroute, mostly travel along main roads such as high speed roads, national roads, county roads and so on, and it is considered to be unlikely that the vehicle will travel along minor roads.

The route RT2 shown by the broken line from the origin point O2 to the destination D2 is a route that is included in the interior of the route correction region RRR, and is comparatively short distance. It is considered that a vehicle that travels along a route of this type that is comparatively short distance may, in the route correction region RRR, often travel along minor roads. Thus, by limiting the combinations of corresponding origin point and destination on routes from the quarter DI3 to the quarter DI1 that are searched through to combinations that satisfy the above described predetermined condition, it is possible to eliminate consideration of the number of times of utilization of road sections by vehicles that are traveling along routes of this type that are relatively short. By doing this, it is possible to limit the subjects that are searched through to combinations of corresponding origin point and destination upon routes of roughly the same distance.

The road section lk0 that has the largest value among the number of times of utilization that have been obtained for each of the road sections is determined as being a provisional place to be passed through, and a corrected route RT0 that includes this road section lk0 is searched for. It would be acceptable, if a plurality of provisional places to be passed through including the road section lk0 have been determined, to search for a corrected route RT0 that includes all of them; and it would also be acceptable to search for a corrected route RT0 that includes the provisional place to be passed through that is the closest to any one among the origin point O, the center point C, and the destination D. The provisional place to be passed through might also be some element other than the road section lk0, such as an intersection or the like. Moreover, it would also be acceptable to divide the road map into a larger number of regions than the four regions that correspond to the quarters DI1, DI2, DI3, and DI4 that designate the quarters from the center point C. Furthermore, the road number of times utilization data stored in the database of the probe data management center could also be supplied to the map database 518 in advance.

On the other hand, FIG. 11B is a figure for explanation of an example of the search processing for finding a provisional place to be passed through when the searching is performed according to search conditions related to the attributes of roads. In FIG. 11B, the route from the origin point O to the destination D is a route that leads from the quarter DI3 to the quarter DI1. From within the route correction region RRR that is specified by the user, included road sections from the quarter DI3 to the quarter DI1 are specified. Those road sections in the road sections that have been specified that are closest to any one among the origin point O, the center point C, and the destination D are extracted, and, on the basis of a priority order, which is included in the search conditions, related to the attribute information of the extracted road sections, for example being a high speed road, being a national road, being a county road, and being a general road in that order, a road section that has any one of these attributes is selected from among the extracted road sections. This selected road section is then set as a provisional place to be passed through. In FIG. 11B, the road sections lk1 and lk2 that are closest to the origin point O are extracted. If it is supposed that the road attribute of the road section lk1 is that it is a county road, while the road attribute of the road section lk2 is that it is a general road, then, since the order of priority based upon the priority order included in the search conditions is that a county road is higher in order than a general road, accordingly the corrected route RT0 that includes the road section lk1 as a provisional place to be passed through is found.

If no corrected route RT0 that includes the road section lk1 as a provisional place to be passed through exists, then it would be acceptable to find the corrected route including, as a provisional place to be passed through, the road section lk2 that is the next highest one in the priority order. It would also be possible to find a corrected route that includes, as a provisional place to be passed through, another road section which is next closest to the origin point O after the road sections lk1 and lk2. The road attribute could also be, for example, the width or the number of vehicle lanes of the road sections. It would also be possible to arrange to search for a corrected route that includes, as a provisional place to be passed through, a road section selected by the user from among, in addition to the road sections lk1 and lk2, also a plurality of road sections that are candidates as provisional places to be passed through, and also including other road sections that are the next closest ones after the road sections lk1 and lk2. It would also be possible for the provisional place to be passed through to be an intersection or the like, rather than the road section lk1.

—Variations—

(1) In the embodiment described above it was arranged for the server device 1 to search for a corrected route as shown in the step S26 of FIG. 2B, on the basis of the corrected route request from the navigation device 1 shown in the step S207 of FIG. 2A. However, as another embodiment of the present invention, it would also be acceptable to arrange for a stand-alone navigation device to search for the corrected route on its own account, without communication with any server device 1. A route search processing flow for this type of stand-alone navigation device 1 is shown in FIGS. 12A and 12B.

Figure 12B:
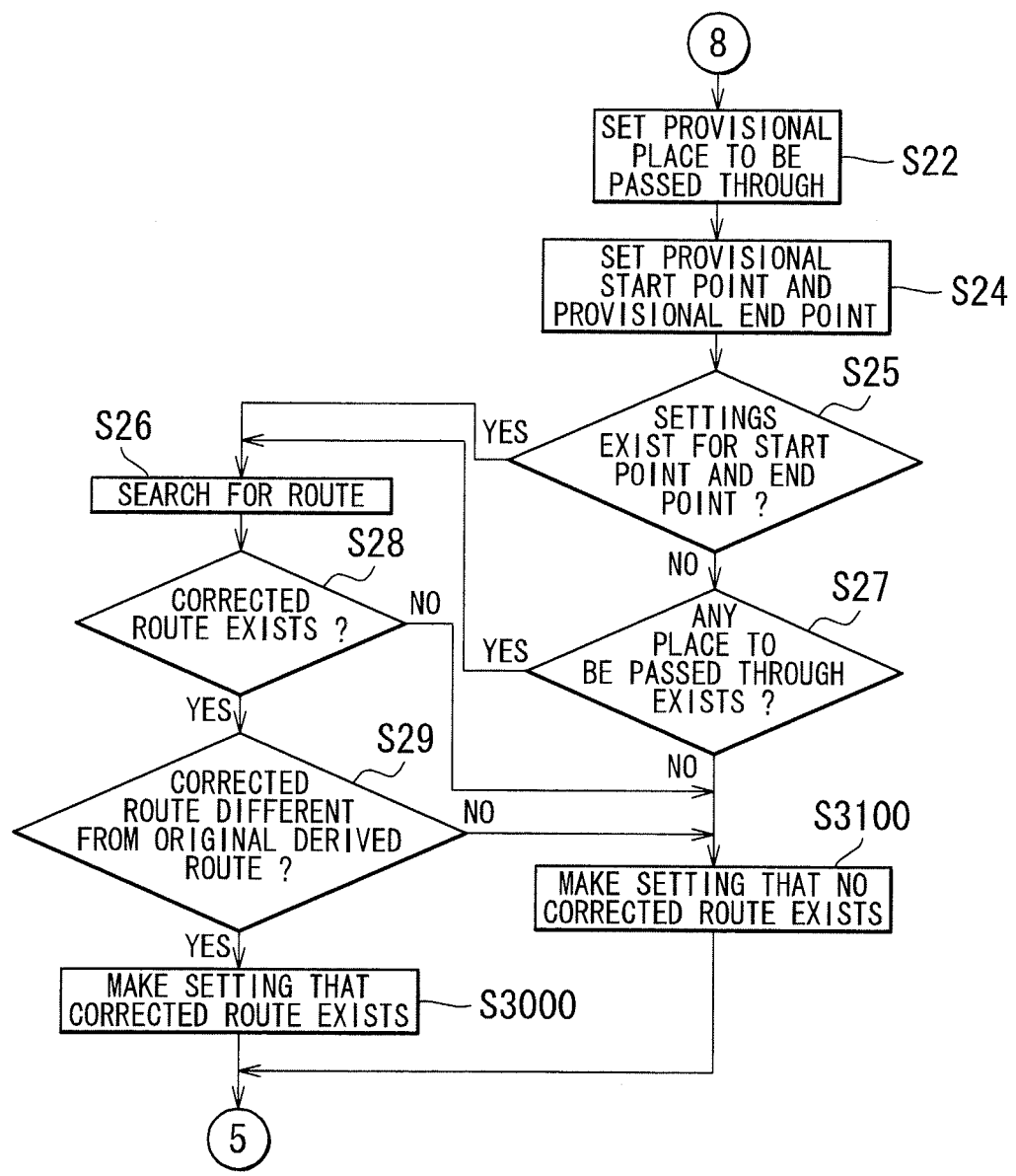

Thus, FIGS. 12 and 12B show this other embodiment of the present invention, in which the corrected route search processing by the server device 1 shown in FIG. 2B is executed by the navigation device 5. The processing details for processing steps in FIGS. 12A and 12B having reference symbols the same as those of processing steps in FIGS. 2A and 2B are approximately the same as the processing details previously explained with reference to those processing steps of FIGS. 2A and 2B. However, when FIGS. 12A and 12B and FIGS. 2A and 2B are compared together, since there is no communication between the navigation device 5 and the server device 1, the steps S207, S208, S20, S30, and S31 are not necessary. Moreover, since it will be sufficient for the setting processing for the provisional place to be passed through and also for the setting processing for the provisional start point and for the provisional end point to be performed only once each, accordingly the steps S205, S206, S21, and S23 are not necessary. Thus, after the step S204, and after a negative decision in the step S2095, the flow of control is transferred to the step S22, and next proceeds to the step S24. Furthermore, instead of distributing the corrected route in the step S30 of FIG. 2A, in a step S3000 of FIG. 12B a setting is made to the effect that a corrected route exists. In a similar manner, instead of transmitting the fact in the step S31 of FIG. 2A that there is no corrected route, in a step S3100 of FIG. 12B a setting is made to the effect that no corrected route exists.

(2) It would also be possible for the server device 1 to receive a search request for a derived route from the navigation device 5 and to refer to the origin point (or the current position of the vehicle), the destination, the search conditions and so on that are included in this search request, and for the calculation of a derived route for the vehicle that is the origin of transmission of the search request from the origin point to the destination, shown in the step S201 of FIG. 2A, to be executed by the route search section 15. In this type of embodiment, the server device 1 corrects the derived route on the basis of the corrected route as shown in the step S210 of FIG. 2A. The route search processing flow in a server device 1 that executes this type of derived route calculation is shown in FIGS. 13A and 13B.

Figure 13A:
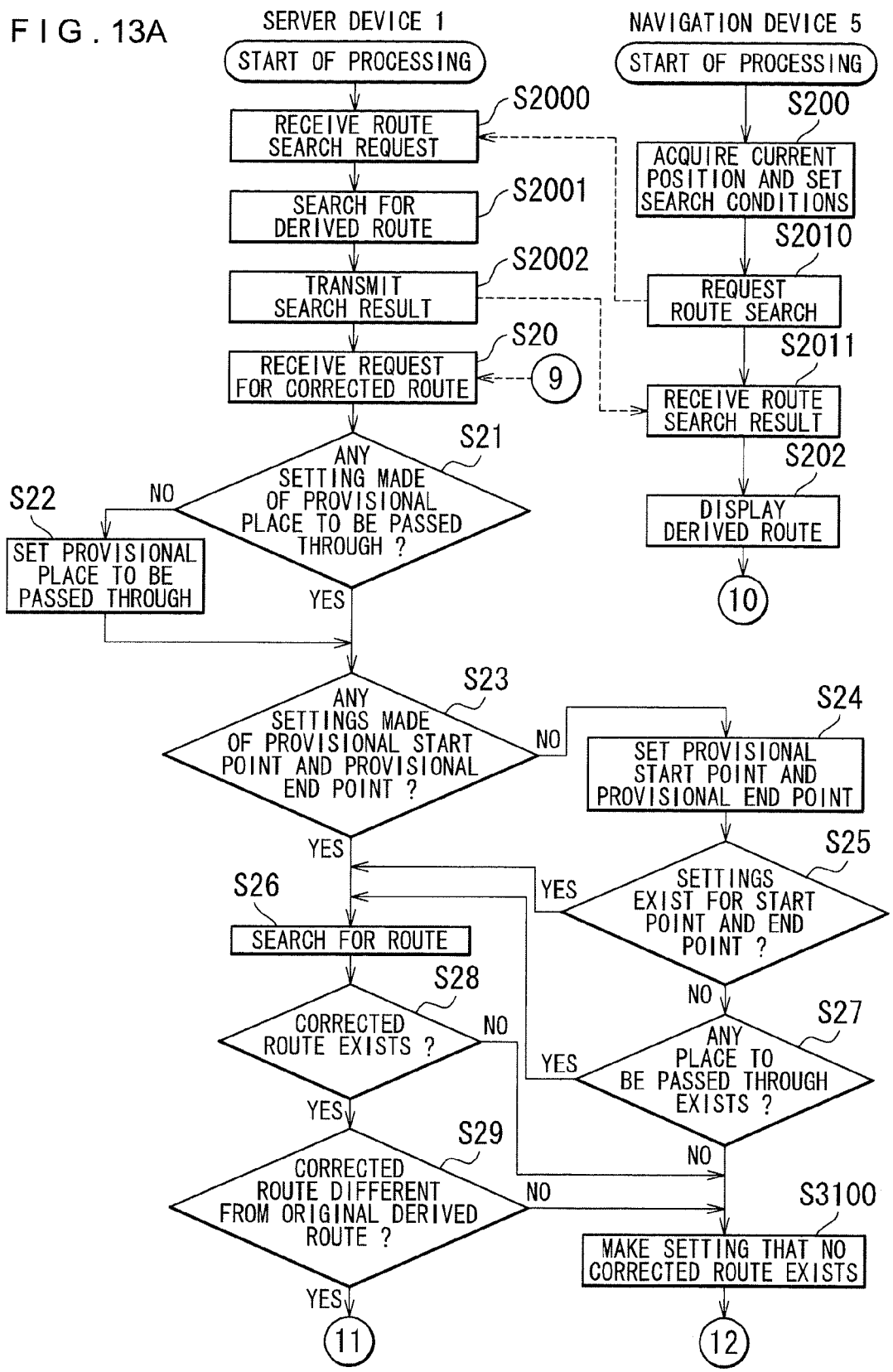
FIGS. 13A and 13B are figures showing a route search processing flow in a server device according to yet another embodiment of the present invention.
Figure 13B:
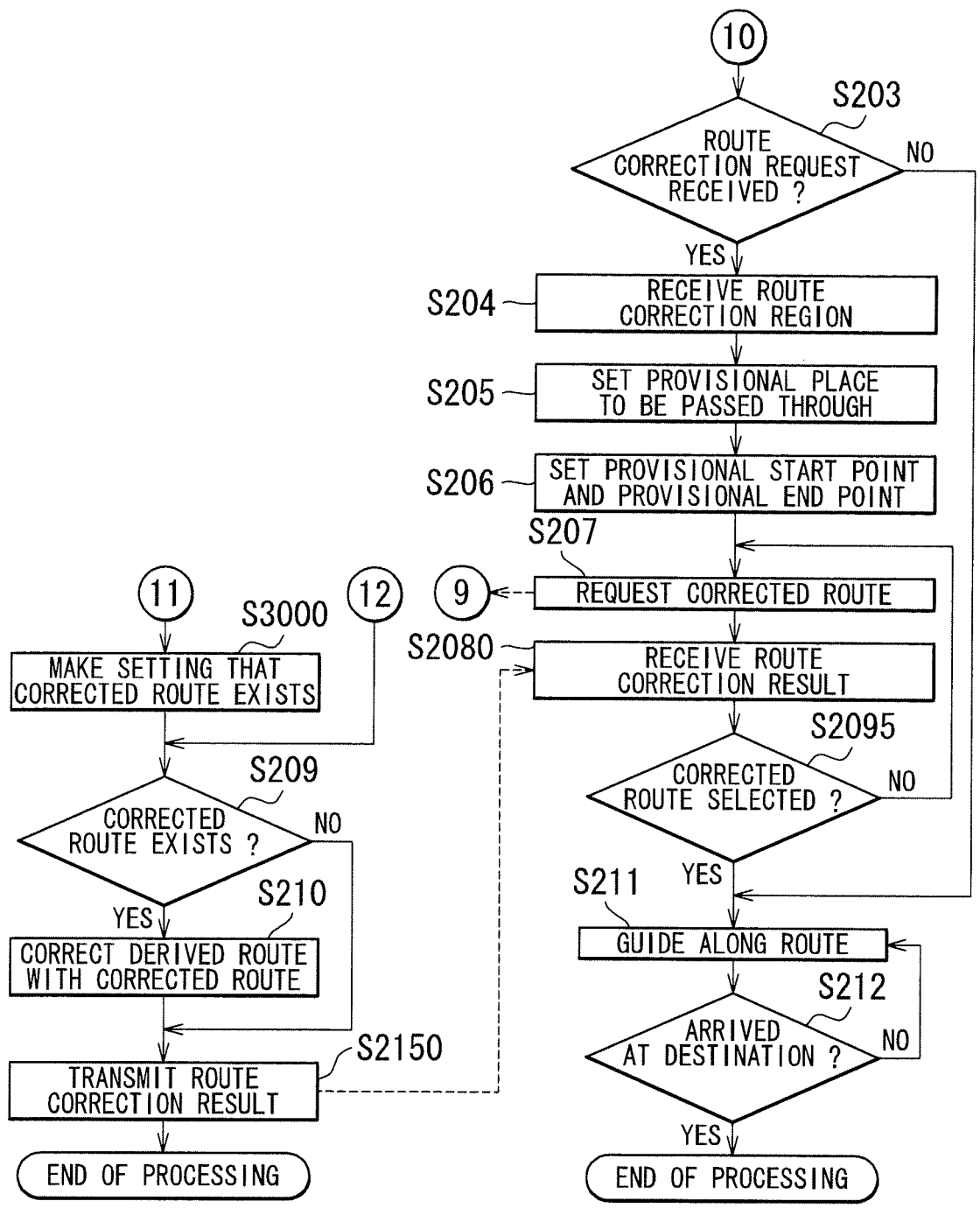

Thus, FIGS. 13A and 13B show another embodiment of the present invention, in which the derived route correction processing by the navigation device 5 shown in FIG. 2A is executed by the server device 1. The processing details for processing steps in FIGS. 13A and 13B having reference symbols the same as those of processing steps in FIGS. 2A and 2B are approximately the same as the processing details previously explained with reference to those processing steps of FIGS. 2A and 2B. However, when FIGS. 13A and 13B and FIGS. 2A and 2B are compared together, since the server device 1 executes the calculation of the derived route, accordingly, instead of the step S201 performed by the navigation device 5, a route search request is transmitted to the server device in a step S2010, and the result of searching for a derived route is received in a step S2011. And, when in a step S2000 the server device 1 receives a route search request from the navigation device 5, it performs search calculation of a derived route in a step S2001, and transmits the result of this search to the navigation device 5 in a step S2002.

While, in the steps S30 and S31 of FIG. 2B, the server device 1 transmitted to the navigation device 5 the presence or absence of a corrected route found on the basis of the corrected route request from the navigation device 5, instead of this, in FIGS. 13A and 13B, the fact that a corrected route exists is set in a step S3000, while in a step S3100 the fact that no corrected route exists is set. Accordingly, the correction of the derived route the basis of the presence or absence of the corrected route is also performed by the server device 1, as shown in the steps S209 and S210 in FIG. 13B. Along with the corrected route in the route correction region, the result of correction of the derived route is transmitted in a step S2150 from the server device 1 to the navigation device 5, and is received by the navigation device 5 in a step S2080.

The above described embodiments are examples, and various modifications can be made without departing from the scope of the invention.

What is claimed is:

1. A route search device, comprising:
map data of a road map;
a derived route acquisition section that acquires a first derived route for a mobile body from an origin point of the mobile body to a destination of the mobile body;
a route correction region acquisition section that acquires a route correction region corresponding to the first derived route;
a place to be passed through setting section that sets a place to be passed through in the route correction region;
a start point and end point setting section that sets a start point and an end point in the route correction region;
a corrected route acquisition section that acquires a corrected route, not included in the first derived route, from the start point and passing through the place to be passed through to arrive at the end point;
a route correction section that corrects the first derived route to a second derived route from the origin point to the destination, constituted by a route from the origin point to the start point, the corrected route, and a route from the end point to the destination; and a pass through frequency storage section that stores, included in the map data, pass through frequencies by a plurality of mobile bodies that pass through at least one of a plurality of intersections and a plurality of roads;
wherein the place to be passed through setting section, by referring to the pass through frequency storage section, sets at least one of an intersection and a road whose pass through frequency is high as the place to be passed through.

2. A route search device according to claim 1, wherein:
the route correction region acquisition section acquires the route correction region in correspondence with a partial region upon the road map; and
the start point and end point setting section calculates a plurality of points of intersection between the external periphery of the route correction region and the first derived route, and determines and sets the start point and the end point respectively from among a plurality of ground points upon the first derived route that are closest to the plurality of points of intersection.

3. A route search device according to claim 1, wherein:
the route correction region acquisition section acquires the route correction region in correspondence with a partial region upon the road map; and
the start point and end point setting section, along with selecting, from among a plurality of intersections that are located in the vicinity of the external periphery of the route correction region, start point candidates for the start point in order of closeness to the origin point, also selects end point candidates for the end point from the plurality of intersections in order of closeness to the destination, then searches for a route section that is connected from a start point candidate among the start point candidates to an end point candidate among the end point candidates, and then sets the start point candidate and the end point candidate of the route section that has been found as the start point and the end point.

4. A server device, comprising:
a route search device according to claim 1;
a reception section that receives the first derived route, the route correction region, and a search condition for the first derived route via a communication network from a navigation device; and
a transmission section that transmits the corrected route to the navigation device; and wherein:
the derived route acquisition section acquires the first derived route that has been received by the reception section; and
the route correction region acquisition section acquires the route correction region that has been received by the reception section.

5. A server device according to claim 4, wherein
the route correction region acquisition section acquires the corrected route on the basis of another search condition that is different from the search condition for the first derived route.

6. A server device, comprising:
a route search device according to claim 1;
a reception section that receives the origin point, the destination, the route correction region, and a search condition for the first derived route via a communication network from a navigation device; and
a transmission section that transmits the first derived route, the second derived route, and the corrected route to the navigation device; wherein
the derived route acquisition section acquires the first derived route by searching and calculation on the basis of the origin point, the destination, the search condition for the first derived route, and the map data.

7. A navigation device, comprising:
a route search device according to claim 1;
a display unit that displays the road map, the first derived route, and the second derived route;
a current position information acquisition section that acquires current position information indicating a current position of the mobile body;
an input section for input by a user of the destination, the route correction region, and a search condition for the first derived route; and
a route guidance section that guides the mobile body using the second derived route; and wherein:
when the mobile body is positioned at the origin point, the origin point is the current position acquired by the current position information acquisition section; and
the route correction region acquisition section acquires the route correction region inputted via the input section.

8. A navigation device according to claim 7, wherein
the display unit displays map information for the route correction region acquired by the route correction region acquisition section and route information for the corrected route, at a larger magnification than map information other than the route correction region and route information other than the corrected route.

9. A navigation device, comprising:
a route search device according to claim 1;
a current position information acquisition section that acquires current position information indicating a current position of the mobile body;
an input section for input by a user of the destination, the route correction region, and a search condition for the first derived route;
a transmission section that transmits the first derived route, the route correction region, and the search condition for the first derived route to a server device via a communication network;
a reception section that receives the corrected route from the server device; and a route guidance section that guides the mobile body using the second derived route; wherein:
when the mobile body is positioned at the origin point, the origin point is the current position acquired by the current position information acquisition section; and
the corrected route acquisition section acquires the corrected route received by the reception section.

* * * * *